United States Patent
Shue et al.

(10) Patent No.: US 11,840,334 B2
(45) Date of Patent: Dec. 12, 2023

(54) SOLAR PANEL INSPECTION BY UNMANNED AERIAL VEHICLE

(71) Applicant: HONEYWELL INTERNATIONAL INC., Morris Plains, NJ (US)

(72) Inventors: Shyh Pyng Jack Shue, Austin, TX (US); Chao Li, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 810 days.

(21) Appl. No.: 16/960,151

(22) PCT Filed: Jan. 24, 2018

(86) PCT No.: PCT/CN2018/074000
§ 371 (c)(1),
(2) Date: Jul. 6, 2020

(87) PCT Pub. No.: WO2019/144317
PCT Pub. Date: Aug. 1, 2019

(65) Prior Publication Data
US 2021/0126582 A1    Apr. 29, 2021

(51) Int. Cl.
*B64C 39/02*    (2023.01)
*G06T 7/00*    (2017.01)
(Continued)

(52) U.S. Cl.
CPC .......... *B64C 39/024* (2013.01); *G06T 7/0002* (2013.01); *H02S 50/15* (2014.12); *B64U 2101/30* (2023.01); *H04N 5/33* (2013.01)

(58) Field of Classification Search
CPC ..... B64C 39/024; G06T 7/0002; H02S 50/15; B64U 2101/30; B64U 2201/10;
(Continued)

(56) References Cited

U.S. PATENT DOCUMENTS 7,658,347 B2    2/2010    Goossen et al.
9,812,269 B1 *  11/2017   Ibarra .................. H02H 1/0015
(Continued)

FOREIGN PATENT DOCUMENTS

CN    206358365 U    7/2017
CN    107111313 A    8/2017
(Continued)

OTHER PUBLICATIONS

Response to Extended Search Report dated Aug. 13, 2021 from counterpart European Application No. 18902551.3 filed Oct. 6, 2021, 13 pp.
(Continued)

*Primary Examiner* — Christopher M Brandt
(74) *Attorney, Agent, or Firm* — Shumaker & Sieffert, P.A.

(57) ABSTRACT

A method for detecting a fault in a solar panel in a solar farm is disclosed. In some examples, the method includes obtaining, by a computing system (106), a first image of the solar panel captured by an unmanned aerial vehicle (UAV) (102) during a first flight and a second image of the solar panel captured by the UAV (102) during a second flight. In some examples, the method also includes determining, by the computing system (106), a first score for the solar panel based on the first image and determining a second score for the solar panel based on the second image. In some examples, the method further includes determining, by the computing system (106), whether the solar panel has the fault based on the first score and the second score and outputting an indication that the solar panel has the fault in response to determining that the solar panel has the fault.

20 Claims, 19 Drawing Sheets

(51) Int. Cl.
*H02S 50/15* (2014.01)
*H04N 5/33* (2023.01)
*B64U 101/30* (2023.01)

(58) Field of Classification Search
CPC ...... B64U 2201/20; B64U 10/13; H04N 5/33; Y02E 10/40; Y02E 10/50; F24S 40/90; G01M 5/0033; G01M 5/005; G01M 5/0091; G05D 1/0094; G06Q 10/0833; G06Q 10/20; G06Q 50/06; G06Q 50/30
See application file for complete search history.

(56) References Cited

U.S. PATENT DOCUMENTS

| | | | |
|---|---|---|---|
| 10,250,821 | B2 | 4/2019 | Pulleti et al. |
| 10,491,778 | B2 | 11/2019 | De Mers et al. |
| 2010/0215212 | A1* | 8/2010 | Flakes, Jr. ............ G05D 1/0094 348/E7.085 |
| 2017/0133983 | A1 | 5/2017 | Moslehi et al. |
| 2017/0192422 | A1 | 7/2017 | Kim et al. |
| 2017/0277966 | A1* | 9/2017 | Abousleman ........ G06V 10/25 |
| 2017/0349279 | A1 | 12/2017 | Garcia-Gabin et al. |
| 2018/0003656 | A1 | 1/2018 | Michini et al. |
| 2019/0031344 | A1 | 1/2019 | Hitchcock |
| 2019/0346842 | A1 | 11/2019 | Bye et al. |
| 2020/0137326 | A1 | 4/2020 | Jahagirdar |
| 2020/0184194 | A1 | 6/2020 | Edara et al. |

FOREIGN PATENT DOCUMENTS

| | | |
|---|---|---|
| CN | 109379040 A | 2/2019 |
| EP | 3591838 A2 | 1/2020 |
| GB | 2546564 A | 7/2017 |
| GB | 2559291 A | 8/2018 |
| JP | 2015058758 A | 3/2015 |
| KR | 101548272 B1 | 8/2015 |
| WO | 2016095985 A1 | 6/2016 |
| WO | 2016154942 A1 | 10/2016 |
| WO | 2017099819 A2 | 6/2017 |
| WO | 2017129960 A1 | 8/2017 |
| WO | 2019041191 A1 | 3/2019 |

OTHER PUBLICATIONS

U.S. Appl. No. 16/744,308, by Honeywell International Inc. (Inventors: Jahagirda et al.), filed Jan. 16, 2020.
Fun, "DJI has launched agricultural drones again, and the status of drones is unshakeable," Jan. 19, 2016, accessed from https.//www.pcpop.com/article/1773300hshtml, 5 pp.
Novatel, "Firmware Align," retrieved from www.novatel.com/assets/Documents/Bulletins/apn048.pdf on Aug. 6, 2020, Version 9, Nov. 2015, 2 pp.
International Preliminary Report on Patentability from International Application No. PCT/CN2018/074000, dated Aug. 6, 2020, 6 pp.
Communication pursuant to Rules 161(2) and 162 EPC from counterpart European Application No. 18902551.3, dated Sep. 1, 2020, 3 pp.
Extended Search Report from counterpart European Application No. 18902551.3, dated Aug. 13, 2021, 6 pp.
Communication Pursuant to Rules 70(2) and 70a(2) EPC dated Aug. 31, 2021, from counterpart European Application No. 18902551.3, 1 pp.
Notice of Intent to Grant and Text Intended to Grant from counterpart European Application No. 18902551.3 dated Jun. 17, 2022, 69 pp.
International Search Report of the International Searching Authority for PCT/CN2018/074000 dated Oct. 24, 2018.

* cited by examiner

SOLAR PANEL INSPECTION BY UNMANNED AERIAL VEHICLE

TECHNICAL FIELD

This disclosure relates to systems for inspection of solar panels.

BACKGROUND

A solar farm may include many solar panels configured to generate electricity. In order to maintain the solar panels in operating condition, workers may manually inspect the solar panels. The manual inspection may detect visible defects on the solar panels.

A worker in a solar farm may use an unmanned aerial vehicle (UAV) with a camera to capture images of solar panels to determine if the panels are defective. The camera may be configured to capture thermographic images that show the temperature gradient on a solar panel. The temperature gradient may indicate whether the solar panel has a defect.

SUMMARY

In general, this disclosure relates to systems for detecting a fault in a solar panel. The detecting process may include one or more unmanned aerial vehicles (UAVs) with cameras configured to capture images of the solar panel at different times. A cloud computing system may obtain the images from the UAV and determine a score based on each image. The score may indicate a condition of the solar panel at the time that each image was captured. The cloud server computing system may be configured to determine whether the solar panel includes a fault based on the scores for the images.

In one example, this disclosure describes a method for detecting a fault in a solar panel in a solar farm. The method includes obtaining, by a computing system, a first image of the solar panel captured by a UAV during a first flight and a second image of the solar panel captured by the UAV during a second flight. The method also includes determining, by the computing system, a first score for the solar panel based on the first image and determining a second score for the solar panel based on the second image. The method further includes determining, by the cloud computing system, that the solar panel includes a fault based on the first score and the second score. The method includes outputting, by the cloud computing system, an indication that the solar panel includes the fault in response to determining that the solar panel includes the fault.

In another example, this disclosure describes a cloud computing system including a memory configured to store a first image of the solar panel captured by a UAV during a first flight and a store a second image of the solar panel captured by the UAV during a second flight. The cloud computing system also includes one or more processing circuits configured to determine a first score for the solar panel based on the first image and a second score for the solar panel based on the first image. The one or more processing circuits are also configured to determine whether the solar panel includes a fault based on the first score and the second score. The one or more processing circuits are further configured to output an indication that the solar panel includes the fault in response to determining that the solar panel includes the fault.

In another example, this disclosure describes a non-transitory computer-readable storage medium having instructions stored thereon that, when executed, lead a cloud computing system to obtain a first image of the solar panel captured by a UAV during a first flight and a second image of the solar panel captured by the UAV during a second flight. The instructions, when executed, also lead a cloud computing system to determine a first score for the solar panel based on the first image and a second score for the solar panel based on the first image. The instructions, when executed, further lead a cloud computing system to determine whether the solar panel includes a fault based on the first score and the second score. The instructions, when executed, lead a cloud computing system to output an indication that the solar panel includes the fault in response to determining that the solar panel includes the fault.

The details of one or more examples of the disclosure are set forth in the accompanying drawings and the description below. Other features, objects, and advantages will be apparent from the description, drawings, and claims.

DETAILED DESCRIPTION

Figure 1:
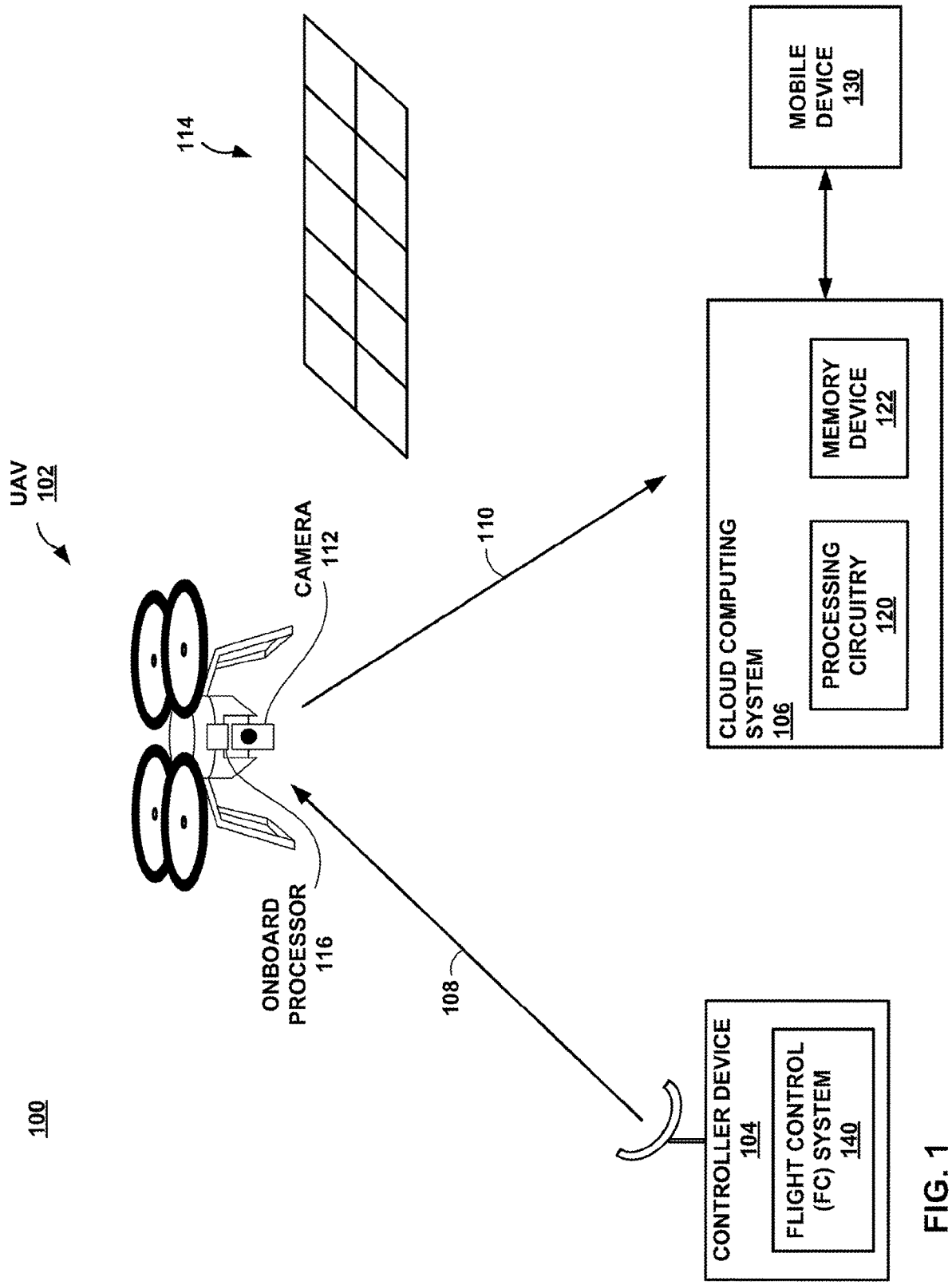
FIG. 1 shows an example Unmanned Aerial Vehicle (UAV) system, which may be configured to implement the techniques of this disclosure.

This disclosure describes systems, devices, methods, and techniques for detecting faults in solar panels based on images of the solar panel captured by an Unmanned Aerial Vehicle (UAV). The techniques may allow detecting faults in all of elements of the solar farm, including the solar panels, electrical wires, inverters, circuit breaker boxes, transformers, towers, mechanical elements that support the solar panels, vegetation and ground status (e.g., erosion) around the solar panels. The term "solar panel assembly" may refer any or all of these elements, including any other elements of the solar farm not listed here. The detection techniques described herein may be performed manually (i.e., with an active human operator), semi-autonomously, or fully autonomously. Semi-autonomous detection techniques may include less human involvement than manual detection.

The individual solar panel location within the solar farm can be identified from the captured images with imposed global positioning system (GPS) data and UAV attitude information. A computing system of this disclosure may also determine the individual solar panel (x, y, z) GPS position, even if the solar farm does not provide its own location and array number. A computing system of this disclosure may be referred to as a "cloud computing system" or a "cloud server computing system" to distinguish the computing system from a flight control (FC) system and a computing system onboard a UAV. In some examples, however, the cloud computing system may be merged with the FC system and/or a processor onboard a UAV.

The processor onboard a UAV may capture, store, and send image data to a cloud computing system. The cloud computing system may obtain and store the captured images to a memory device. The cloud computing system may store the image data with imposed GPS and UAV attitude information gathered by the processor onboard the UAV. The captured images, along with the GPS and attitude information, may make up a big data database for the cloud application to perform analytics. The method may include using the GPS position and UAV attitude for each image to generate a map of the entire solar panel field down to the size as small as an individual solar panel unit or another element of a solar panel assembly. The cloud application may integrate each image into the model of the solar farm so that a user can access all of the data, including images, relating to a solar panel through the cloud application. Therefore, the cloud computing system can trace individual solar panel very accurately.

Once the solar panel fault status, location, and score are determined by the cloud computing system, the cloud server and smart phone application technology may be configured to manage the entire solar farm or a portion thereof. The cloud application may associate a solar field worker with one or more elements of a solar panel assembly, such that the worker can be appointed to the identified solar panel location to work on the solar panel assembly to either maintain, repair, or replace the assembly or an element thereof. The cloud server computing system can also help the worker record the maintenance task and any details when the work is done. The worker can update the original solar panel manufacturing tracking number in the cloud application if the solar panel is replaced.

The cloud application may be configured to keep records on each individual solar panel from the entire solar farm, such that the cloud application will have full traceability capability for each solar panel. Using the traceability capability, the cloud application may keep track of the status of each solar panel. The cloud application may update the status based on each new image and worker report. The cloud application may determine a score based on a new image and then determine whether a solar panel has a fault based on the new score and previous score(s) (see, e.g., FIG. 9).

The method, by the cloud computing system, posts the entire solar panel fault findings into the cloud. The cloud will put all data into a cloud application so that the solar field worker and supervisor can use the cloud application to find the faulted solar panel location and fault status. The maintenance and repairing tasks can then be performed using the cloud application to become a seamless connection from the images captured by a UAV to a solar panel field map up to the individual solar panel. The cloud application may also be configured to detect solar fault based on analyzing the captured images, determine the locations of faults on the solar panels, traceability of the faults on the solar panels and other elements of the solar panel assembly, assist with maintenance/repairing/replacing tasks by workers, and then allow workers to report maintenance issues.

The cloud application may provide task assignments to workers based on input data such as images. Once the cloud computing system receives the input data, the cloud computing system may be configured to operate autonomously without human intervention. For example, the cloud application may assess the images for faults, categories the faults (major, minor, etc.), and then assign repair and maintenance tasks to worker. The cloud application may also trace faults or the possibility of faults over time because one image may not be enough to conclusively show, or show beyond a threshold confidence level, that a solar panel has a fault. As compared to a human being manually looking through images for a fault, the cloud computing system may have much higher accuracy rates for detecting faults. The cloud computing system may also handle many hundreds or thousands of times as much data and images as a human worker could view and analyze for faults. In addition, the detection algorithms shown in FIGS. 7, 10, 11, 12, 13, and 14 in the cloud application for visible images, infrared images, and electroluminescence test images may improve the fault detection and tracing process for solar farms and other facilities.

FIG. 1 shows an example of an Unmanned Aerial Vehicle (UAV) system 100, which may be configured to implement the techniques of this disclosure. UAV system 100 includes a UAV 102, a controller device 104, and a cloud computing system 106. In UAV system 100, controller device 104 controls a flight path and data gathering functions of UAV 102. Cloud computing system 106 processes the data collected by UAV 102. Although shown as separate devices in FIG. 1, in some UAV systems, the functionality of controller device 104 and cloud computing system 106 may be performed by a common device. UAV 102 may be a part of a fleet of UAVs, where more than one UAV may capture the images as described herein.

UAV 102 is shown in FIG. 1 as a quadcopter, but UAV 102 may be any type of UAV including, but not limited to, a rotorcraft, a fixed wing aircraft, compound aircraft such as tilt-rotor, X2 and X3, an aerostat, or any other such type of UAV including all vertical take-off and landing (VTOL), tail-sitter, etc. UAV 102 may be configured to fly with various degrees of autonomy. In some examples, UAV 102 may be under the constant, or near constant, control of a user of controller device 104. In other examples, controller device 104 may deliver a mission, including a flight plan, to UAV 102, and onboard processor 116 of UAV 102 may be configured to execute the mission, with little or no additional user input. Onboard processor 116 may include FC capabilities. In some examples, UAV 102 may use LIDAR for collision avoidance. Onboard processor 116 may be configured to autonomous navigate the flight path of UAV 102, e.g., along a predefined route through a solar farm. Onboard processor 116 may also be configured to receive commands from controller device 104 to control the movements of UAV 102.

Although the techniques of this disclosure are not limited to any particular type of UAV, UAV 102 may, for example, be a relatively small, low altitude, and low speed UAV, where in this context, small corresponds to under 100 pounds, low altitude corresponds to operating altitudes less than 3000 feet above ground, and low air speed corresponds to air speeds less than 250 knots. Furthermore, it is contemplated that UAV 102 may have hovering capabilities, meaning UAV 102 may have the capability of remaining at an approximately constant location in the air.

UAV 102 may have the following functionality: automatic takeoff and landing, waypoint flight plans, go-home mode, initiation of a waypoint, and automatic camera triggering functions. UAV 102 may include bent and/or curved legs to make landing on slopes or uneven surface easier. Go-home mode may be initiated automatically or manually by one of the following events: user input, low battery, overheating, weather changes, system malfunction, lost line of sight between user and UAV, obstacle collision avoidance, and/or unacceptable levels of uncertainty or unusual behavior.

In some examples, controller device 104 comprises a general-purpose device such as a personal digital assistant (PDA), a laptop or desktop computer, a tablet computer, a cellular or satellite radio telephone, a "smart phone," or another such device. In examples where controller device 104 is a general-purpose device, controller device 104 may be loaded with and configured to execute software designed to control UAV 102. In other examples, controller device 104 is a special-purpose device designed specifically for use in controlling UAV 102. Controller device 104 includes FC control and navigation system 140 for controlling the movements of UAV 102. Controller device 104 may include a handheld device and/or be a part of a ground control base station.

Controller device 104 communicates with UAV 102 via communication link 108. Communication link 108 may, for example, be a direct link through a radio communication protocol, such as WiFi, radio frequency wireless, Bluetooth, ZigBee, a proprietary protocol, or any other suitable protocol. In other examples, communication link 108 may be a network-based link where controller device 104 communicates with UAV 102 through one or more intermediary devices such as gateways, routers, switches, repeaters, or other such network devices. Communication link 108 may include a wired connection or a mobile storage device. The wired connection may include universal serial bus (USB) or RS-232. The mobile storage device may include a thumb drive, a Secure Digital (SD) card, or an external storage device (e.g., solid state memory or a hard drive).

Cloud computing system 106 comprises one or more computing devices. Cloud computing system 106 may include one or more server computing device for receiving and processing data and one or more mobile devices for, among other things, presenting information to users. For example, cloud computing system 106 may comprise a general-purpose device, such as a personal digital assistant (PDA), a laptop or desktop computer, a tablet computer, a smart phone, a server device, or another such device. Cloud computing system 106 may be loaded with and configured to execute software designed to process data collected by UAV 102. In some examples, UAV 102 is configured to stream data to cloud computing system 106 in real-time or near real time via, for example, a wireless communication link 110. In other examples, UAV 102 FC processor stores data while in flight and transfers the data to cloud computing system 106 at a later time, such as after the completion of a flight.

One or more cameras 112 are mounted on UAV 102. In accordance with a technique of this disclosure, cameras 112 may include one or more cameras capable of capturing images of infrared radiation. The one or more cameras 112 may include thermographic cameras. Additionally, in some examples of this disclosure, cameras 112 may include one or more cameras capable of capturing images of visible light.

As shown in the example of FIG. 1, cameras 112 may be configured to capture images of structure 114. Although illustrated in FIG. 1 as a solar panel, structure 114 may include a building, a dam, a wind turbine, a monument, a bridge, a levee, a seawall, a pier, an antenna, a volcano, a pump station, gas or oil pipeline, power plant, manufacturing plant, an electric utility facility, or another type of artificial or natural structure. Structure 114 may include a single solar panel or multiple solar panels that are mounted on the ground or on a building, structure, or hill. In some examples, cameras 112 may be configured to capture an image of more than one solar panel at a time. Structure 114 may also include mechanical elements that support the solar panels, wires, circuit breaker boxes, towers, and transformers. The inspection process may also include analysis the status of the ground and vegetation around structure 114 because vegetation may block sunlight and ground erosion may impact the performance of the solar panels.

In accordance with a technique of this disclosure, UAV 102 flies to predetermined image capture locations within a solar farm. Onboard processor 116 and/or controller device 104 may control the movements of UAV 102 to cause UAV 102 to fly to the predetermined locations. At each of the image capture locations, cameras 112 of UAV 102 capture a first set of one or more infrared images of structure 114 and/or one or more visible-light images of structure 114. Onboard processor 116 may define and save each of the image capture locations in terms of x, y, and z coordinates with UAV attitude information so that cloud computing system 106 can determine the location of each individual solar panel using pre-defined formulae. In some examples, onboard processor 116 saves the captured images on a Secure Digital (SD) card or other type of memory card, and may also transfer on-line to a cloud-based web server using 3G, 4G, 5G, Narrow Band-Internet of Things (NBIOT), or another wireless type of transmission technologies.

In some examples, UAV 102 is equipped with one or more differential Global Navigation Satellite System (GNSS) devices to assist UAV 102 navigate to the image capture locations. For instance, UAV 102 and/or onboard processor 116 may be equipped for real-time kinematics (RTK), which is a type of differential GNSS that may provide high positioning performing for UAV 102 in the vicinity of a base station. In some examples, accuracy of the GNSS devices may be within one centimeter. Controller device 104 may be configured to determine and transmit RTK to UAV 102, or onboard processor 116 may determine RTK to assist the flight of UAV 102.

The first set of images may include the infrared images and/or visible-light images and may show the condition of structure 114, such as the temperature, color, appearance, visible flaws, debris, etc. Onboard processor 116 stores the first set of captured infrared images for later analysis. Onboard processor 116 may transfer the images to cloud computing system 106, and onboard processor 116 and/or cloud computing system 106 may be configured to determine a score based on the first set of images captured at the first time.

During a subsequent flight, UAV 102 returns to the same predetermined image capture locations and captures a second set of infrared images and/or visible-light images of structure 114. In some examples, a different UAV in a fleet may fly to the same predetermined image capture locations and capture a second set of infrared images and/or visible-light images of structure 114. Cloud computing system 106 may store the second set of infrared images for later analysis. Cloud computing system 106 may also store the second set of captured images for later analysis. Cloud computing system 106 may be configured to determine a score based on the second set of images captured at the second time. In some examples, the second time may be at least the next day after the first time. Each of the first set of images and the second set of images may have a single image.

In various examples, UAV 102 captures the second set of images during a second flight after various time periods have elapsed or after various events have occurred. For example, UAV 102 may capture sets of images daily, weekly, monthly, yearly, or after some other time period has elapsed. In some examples, UAV 102 captures a set of images after an event has occurred such as a decline in the power generated by structure 114 or after a major weather event.

The predefined image capture locations may be aligned with rows of solar panels in a solar farm. For instance, the solar farm may have solar panels that are oriented to the south at sixty degrees above horizontal. For example, the predefined image capture locations may be located several meters south of each row of solar panels to allow for images to be captured at a desirable angle (see FIG. 6).

For each respective image of the second set of images, cloud computing system 106 may be configured to attempt to identify a corresponding image in the first set of images. The corresponding image may be captured from the same image capture location as the image in the second set of infrared images. Cloud computing system 106 may identify a corresponding image in various ways. For example, cloud computing system 106 may receive image capture location coordinates (e.g., coordinates in x, y, and z dimensions) for each image with UAV attitude data. The image capture location coordinates for an image indicate coordinates of UAV 102 when camera 112 captured the image. In this example, cloud computing system 106 may determine that one image corresponds to another image based on the images being associated with the same image capture location coordinates.

Cloud computing system 106 may be configured to determine a score for structure 114 in an image based on the condition of structure 114, as shown in the image. A higher score may indicate a higher likelihood of a fault in structure 114. For example, cloud computing system 106 may be configured to determine a score based on an infrared image by determining the temperature and/or color of structure 114 and also color of the infrared image. Cloud computing system 106 may also determine the temperature and/or color discrepancy across structure 114, where a larger temperature and/or color discrepancy may indicate a higher likelihood of a fault in structure 114. The temperature discrepancy across structure 114 may refer to the difference between the highest temperature on the surface of structure 114 and the lowest temperature on the surface of structure 114. For example, in the infrared image, the cloud computing system 106 may use the temperature discrepancy on the image and the color of the image location to determine the fault status in structure 114.

Cloud computing system 106 may be configured to determine a score based on a visible-light image based on visible defects on structure 114. Examples of defects in visible-light images include cracks, spalling, warping or bending of structural elements, debris accumulations (e.g., dust, metal shavings, rust flakes, bird fecal matter), and so on. In some examples, cloud computing system 106 may map visual-light images (which are associated with particular image capture locations in (x, y, z) space) to 2-D and/or 3-D models of a structure. Thus, in some examples, cloud computing system 106 may associate individual features, such as corners, of the structure with visual-light images. This may allow cloud computing system 106 and/or a user to identify and store data indicating positions in the structure that need maintenance or repair.

Beside the solar panels, cloud computing system 106 may monitor the status of the ground surrounding the solar panel from visible images for ground loss (e.g., erosion). Erosion of the ground surrounding solar panels may be especially important in hilly and mountainous terrain. In some examples, cloud computing system 106 may also use visible images to determine if the grass and other vegetation surrounding on the solar panel is too tall because the vegetation may block the solar panel and thereby decrease the power generation of the solar farm. In some examples, cloud computing system 106 may use visible images to check the status of the wire connections of the solar farm. For example, if a wire breaks due to a bite by small animal such as a mouse, or due to a bird nest, cloud computing system 106 may use the visible images of the solar panels and the surrounding areas to determine the conditions of wires and other elements of the solar assembly, so that the cloud application can assign maintenance workers to fix the faulty condition(s).

Cloud computing system 106 may also be configured to determine a score based on changes to structure 114 between a first image and a second image. In some examples, cloud computing system 106 retrieves (e.g., automatically, in response to user input, etc.) visible-light images corresponding to infrared images in response to cloud computing system 106 determining, based on a comparison of the infrared images, that a position of the structure has changed during the time interval. A user may use the retrieved visible-light images to perform further inspection of the structure and to identify inspection targets. For instance, in the case where the structure comprises a set of solar panels, a user may use the visible-light images to identify cracking or jamming of the solar panels. Use of the visible-light images may help the user verify that the results of the analysis of the infrared images and may help identify positions of damaged surfaces for the purpose of maintenance and repair. In some examples, a user may use the visible-light images to determine maintenance or repair requirements in materials, processes, procedures, schedule estimate, and issuance of work orders.

Cloud computing system 106 and/or onboard processor 116 may determine a total score for structure 114 based on the images. Onboard processor 116 may process images after camera 112 captures the images. In some examples, onboard processor 116 may store the images to a memory device onboard UAV 102 and then transmit the images to cloud computing system 106 for processing and fault determinations.

Figure 9:
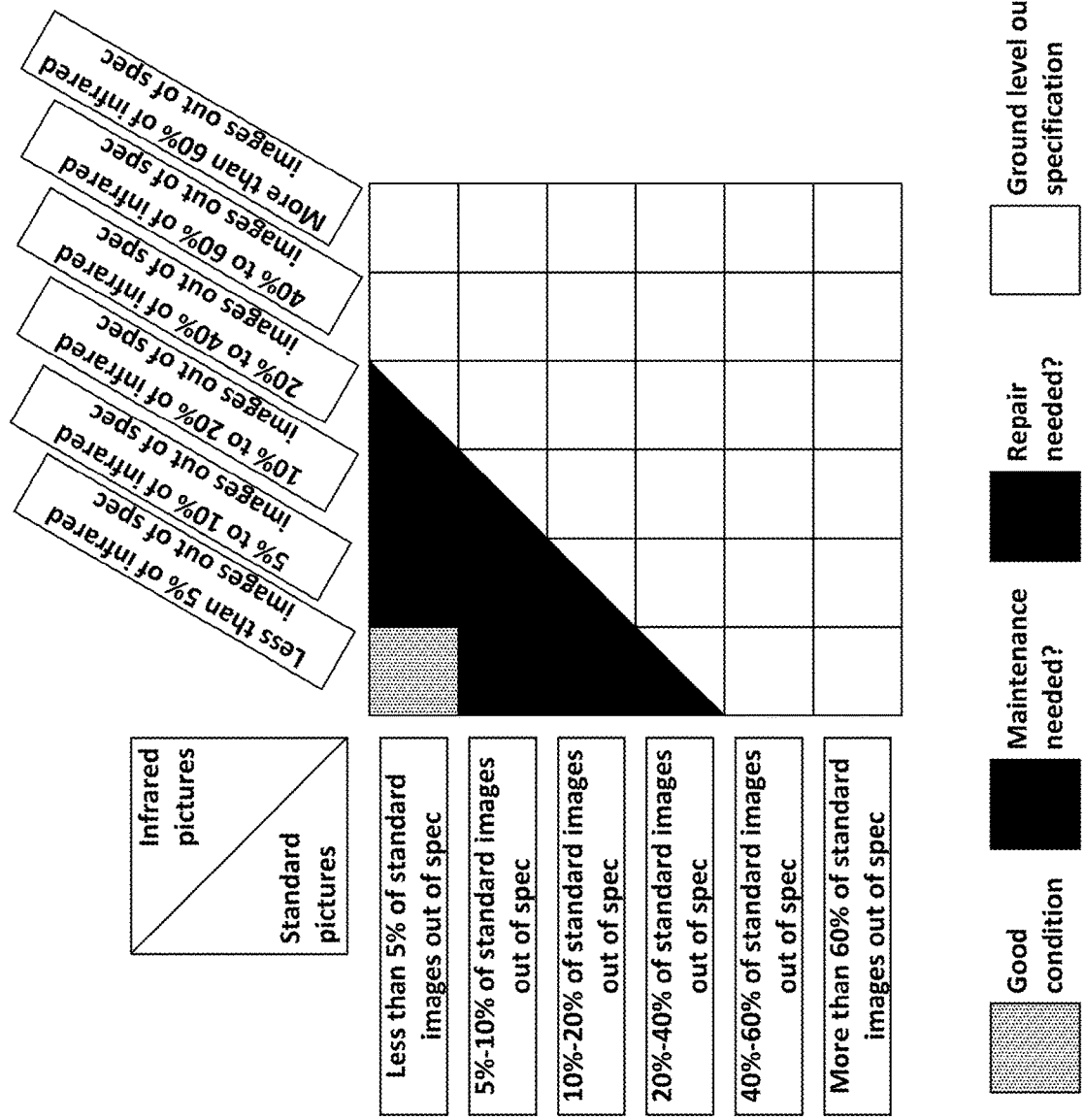
FIG. 9 illustrates a decision chart for ground-level movements, in accordance with a technique of this disclosure.

The total score may be used to assess whether structure 114 includes a fault. In some examples, to determine the total score, cloud computing system 106 and/or onboard processor 116 may determine the total score for the structure as the percentage of images in a set of images (e.g., the second set of infrared images described above) having scores greater than a particular threshold. For instance, in one example, cloud computing system 106 may rank images in a set of images according to their respective scores (e.g., in descending order or ascending order). A cumulative alert score curve is a curve in a chart mapping the ranked images to their scores. In this example, after ranking the images, cloud computing system 106 may determine the percentage of images having scores that fall into a most severe category. In this example, this percentage may be the total score for the structure. Images having scores in the most severe category are referred to as out-of-spec images. FIG. 9, discussed in detail below, illustrates another example of how to determine whether trigger points have been reached for conducting maintenance on the structure, repairs to the structure, or whether the structure must be evacuated or condemned.

In some examples, onboard processor 116 adjusts images to correct for yaw, attitude, and tilt differences between the images and historical images. In some examples, UAV 102 includes various sensors to detect an inflight orientation of UAV 102. Such sensors may include a compass and/or gyroscope to detect yaw, gyroscopes to detect attitude and tilt, and so on. Onboard processor 116 may send orientation data for each image in a historical set of images, such as the first set of infrared images discussed above. For example, the orientation data for a first image in the historical set of images may indicate that UAV 102 was tilted 2° when a camera mounted on UAV 102 captured the image. In this example, the orientation data for a second image (e.g., an image in the second set of infrared images) may indicate that UAV 102 was tilted 5° when the camera mounted on UAV 102 captured the second image. Furthermore, in this example, onboard processor 116 may rotate the second image −3° to align the first image and the second image. In this way, the first and second images may be aligned. In other examples, onboard processor 116 may apply skew effects to pictures to compensate for yaw and attitude differences. Cloud computing system 106 may receive perform similar processes for both infrared and visible-light images from onboard processor 116.

Cloud computing system 106 may also perform various other types of pre-treatment on the images. For example, cloud computing system 106 may apply various filters to the images (e.g., to increase contrast, reduce noise, and so on. In some examples, cloud computing system 106 may zoom in or zoom out the images for consistent view. In some examples, cloud computing system 106 may amplify other special characteristics in the images. For example, various environmental conditions, such as bright skies, cloudy skies, rain, fog, and so on, may affect the quality of infrared and visible light images captured by UAV 102. Additionally, wind may cause UAV 102 to vibrate, potentially resulting in blurred images. Cloud computing system 106 may apply various effects to images to compensate for environmental conditions. For example, cloud computing system 106 may apply filters to remove blur and may zoom in or zoom out. For infrared images, cloud computing system 106 may add a contrast color factor to emphasize and clarify the laser lines.

In some examples, onboard processor 116 superimposes infrared images with contemporaneous visible-light images with GPS and UAV attitude information embedded into the images. The embedded information may allow onboard processor 116 and/or cloud computing system 106 to associate each image with an element of a solar panel assembly. For instance, onboard processor 116 and/or cloud computing system 106 may use control surfaces to apply a colored layer mask to a visible-light image to superimpose a corresponding infrared image on the visible-light image. The control surfaces may include identifiable landmarks in the images that can be used to match up corresponding positions in the visible-light image and the infrared image. For example, UAV 102 may concurrently capture an infrared image and a visible-light image. In this example, onboard processor 116 and/or cloud computing system 106 may superimpose the infrared image onto the visible-light image such that the resulting image shows laser beams emitted by lasers attached to a structure and also an ordinary visible light image of the structure.

Cloud computing system 106 may be configured to output an alert indicating that structure 114 has a fault based on the scores of each image. Cloud computing system 106 may, for example, average the scores of the images of structure 114 and compare the average score to a threshold score. Cloud computing system 106 may also look for a structure with a single score that exceeds a threshold score and then analyze the other scores for the structure to determine if the single score is an aberration. A score that is an aberration may be inaccurate and due to weather conditions on the day of the corresponding image. Cloud computing system 106 may use a technique as shown in FIG. 9, where the determination of whether structure 114 has a fault is based on the percentage of visible-light images and the percentage of infrared images that are out of specification.

In some examples, cloud computing system 106 may determine that structure 114 has a fault by determining whether to recommend structure 114 for maintenance, repair, or replacement. A higher score may result in replacement (e.g., for a crack in structure 114), while a lower score may result in maintenance or repair. The lowest range of scores may result in no recommendation.

Figure 2:
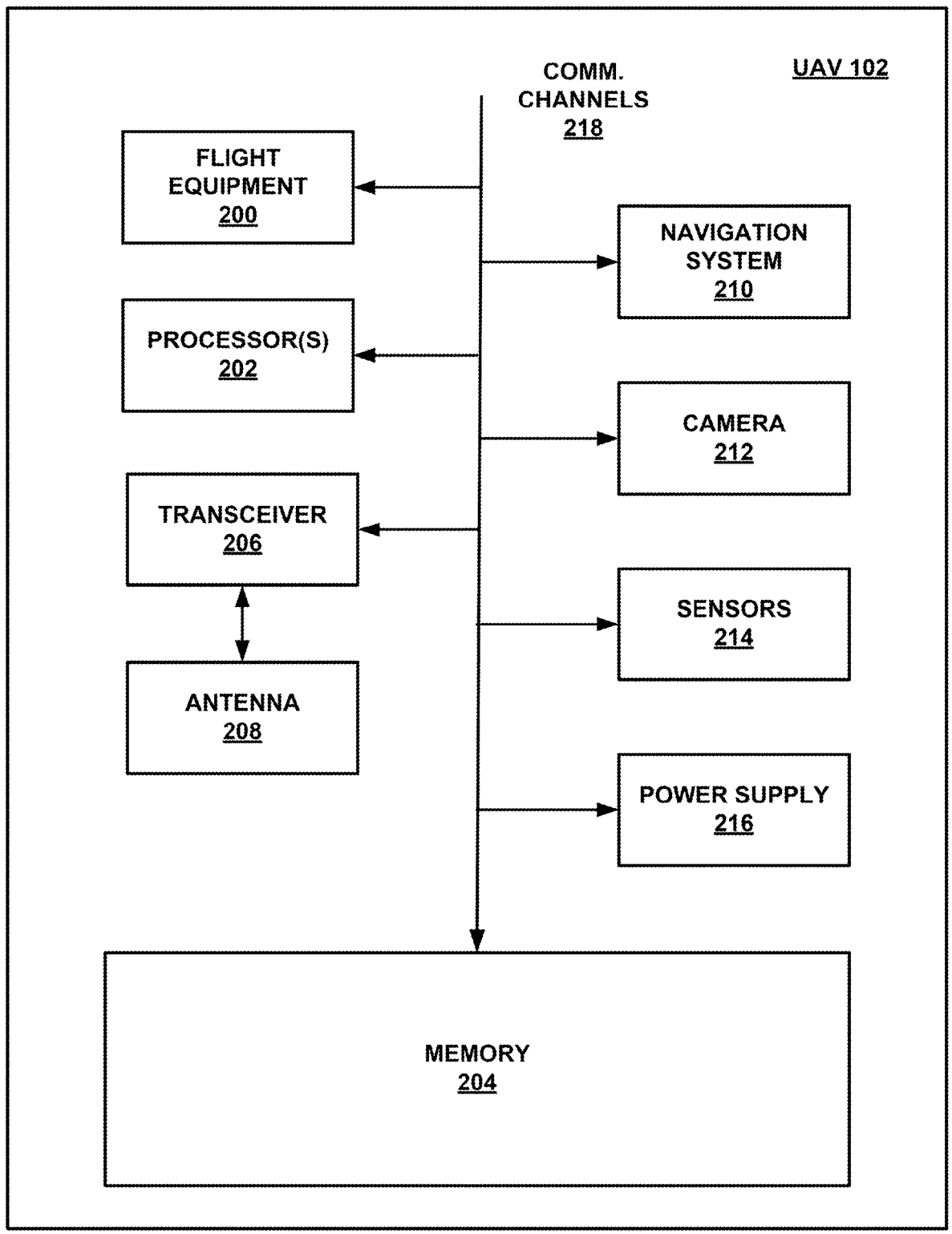
FIG. 2 is a block diagram illustrating example components of a UAV that may be used to implement techniques of this disclosure.

FIG. 2 shows an example illustration of UAV 102. UAV 102 includes flight equipment 200, processor 202, memory 204, transceiver 206, antenna 208, navigation system 210, camera 212, sensor 214, and power supply 216. Communication channels 218 interconnect each of flight equipment 200, processor 202, memory 204, transceiver 206, antenna 208, navigation system 210, camera 212, sensor 214, and power supply 216 for inter-component communications (physically, communicatively, and/or operatively). In some examples, communication channels 218 include a system bus, a network connection, an inter-process communication data structure, or any other method for communicating data, including various types of wireless communication technologies. Power supply 216 may provide electrical energy to each of the other components of UAV 102. In some examples, power supply 216 is a battery.

Processor 202 is intended to represent all processing circuitry and all processing capabilities of UAV 102, including the capabilities of onboard processor 116. Processor 202 may, for example, include one or more digital signal processors (DSPs), general purpose microprocessors, integrated circuits (ICs) or a set of ICs (e.g., a chip set), application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Processor 202 may also include FC capabilities, such as GPS positioning and attitude determinations.

Memory 204 is intended to represent all of the various memory devices within UAV 102. Memory 204 constitutes a computer-readable storage medium and may take the form of either a volatile memory that does not maintain stored contents once UAV 102 is turned off or a non-volatile memory that stores contents for longer periods of time, including periods of time when UAV 102 is an unpowered state. Examples of volatile memories include random access memories (RAM), dynamic random access memories (DRAM), static random access memories (SRAM), integrated random access memory (IRAM), thyristor random access memory (TRAM), zero-capacitor random access memory (ZRAM), or any other type of suitable volatile memory. Examples of non-volatile memory include optical disk drives, magnetic disk drives, flash memory, read only memory (ROM), forms of electrically programmable memories (EPROM) or electrically erasable and programmable memories (EEPROM), or any other such type of non-volatile memory. Memory 204 may be configured to store boundaries of a solar farm, predefined routes through the solar farm, and predefined flight locations within the solar farm for capturing images.

The functionality of UAV 102 is implemented by hardware, software, firmware, or combinations thereof. Memory 204 may store software and firmware that include sets of instructions. Processor 202 and, other hardware components of UAV 102, may execute the instructions to perform the techniques of this disclosure.

Transceiver 206 is configured to send and receive data using antenna 208. Transceiver 206 may send and receive data according to any of the wireless communication protocols described elsewhere in this disclosure. For example, transceiver 206 may be configured to receive navigation instructions. Additionally, transceiver 206 may be configured to send images and other data to a computing system, such as controller device 104 (FIG. 1) or cloud computing system (FIG. 1). Transceiver 206 may communicate with controller device 104 (e.g., FC system 104) with respect to navigation, routes, locations, and so on.

Navigation system 210 controls a flight path of UAV 102. For example, navigation system 210 may output signals to flight equipment 200 to instruct UAV 102 to fly to predetermined image capture locations, to land, or to otherwise navigate to locations along a flight path of UAV 102.

Camera 212 is configured to capture infrared images. Additionally, in some examples, camera 212 is configured to capture visible light images. In some examples, the same camera captures both infrared images and visible light images. In other examples, UAV 102 has separate cameras to capture infrared images and visible light images. Processors 202 may be configured to control camera 212.

Sensor 214 are intended to represent all the various sensors included in UAV 102. UAV 102 may, for example, include one or more sensors used for flight management, such as accelerometers, gyroscopes, magnetometers, barometers, GNSS sensors, tilt sensors, inertial measurement sensors, speed sensors, and others.

Figure 3:
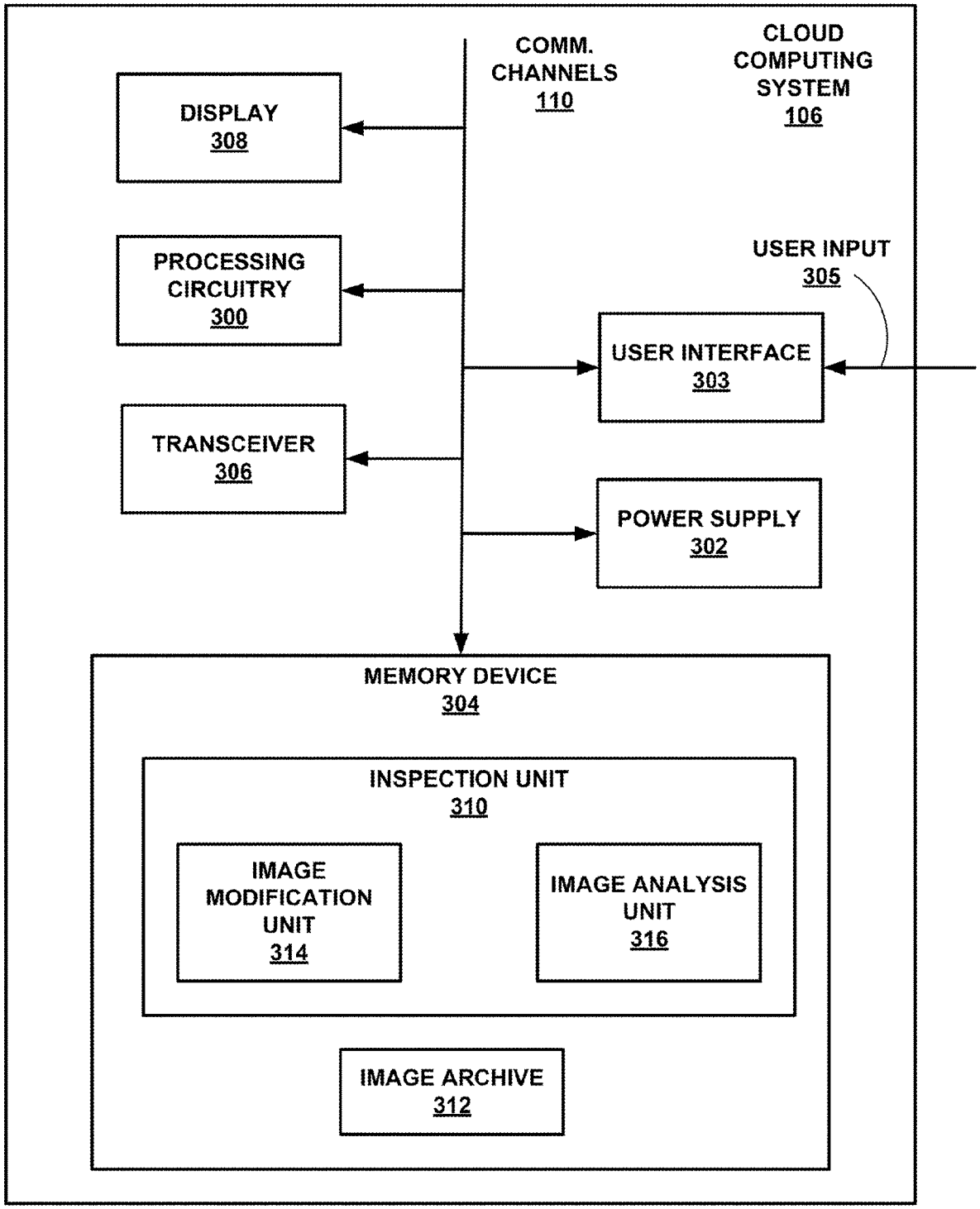
FIG. 3 is a block diagram illustrating example components of a cloud computing system, in accordance with a technique of this disclosure.

FIG. 3 is a block diagram illustrating example components of cloud computing system 106, in accordance with one or more techniques of this disclosure. In the example of FIG. 3, cloud computing system 106 includes one or more processing circuits 300, power supply 302, user interface 303, memory 304, transceiver 306, a display 308. Communication channels 110 interconnect processing circuits 300, memory 304, transceiver 306, and display 308. Power supply 302 provides power to processing circuits 300, memory 304, transceiver 306 and display 308. Processing circuits 300, memory 304, transceiver 306, and display 308 may be implemented in a manner similar to processing circuits 202, memory 204, and transceiver 206 described above with respect to FIG. 2. Display 308 may comprise various types of displays for outputting data, such as liquid crystal displays, plasma displays, light emitting diode (LED) displays, and so on.

User interface 303 may be configured to receive user inputs 305. User interface 303 may include a keyboard, mouse, touchpad, touchscreen, etc. User inputs 305 may include a user assigning a solar panel or an area of a solar farm to another user. User inputs 305 may also include selecting an icon on a graphical user interface presented by processing circuitry 300 on display 308.

In the example of FIG. 3, memory 304 stores an inspection unit 310 and an image archive 312. Furthermore, as shown in the example of FIG. 3, inspection unit 310 comprises an image modification unit 314 and an image analysis unit 316. Inspection unit 310, image modification unit 314, and image analysis unit 316 may comprise instructions that, when executed by processing circuits 300, cause cloud computing system 106 to perform actions ascribed in this disclosure to inspection unit 310, image modification unit 314, and image analysis unit 316.

In the example of FIG. 3, inspection unit 310 may configure transceiver 306 to receive data from UAV 102 (e.g., FIG. 1 and FIG. 2). As a result, inspection unit 310 may receive various types of data from UAV 102. For example, inspection unit 310 may receive image data, orientation data, image capture location coordinate data, and other types of data from UAV 102. Thus, transceiver 306 may be configured to receive an image captured by a camera mounted on an UAV, where the image is of a structure.

In some examples, image modification unit 314 performs image pre-treatment functions to images. For example, image modification unit 314 may rotate or skew an image received from UAV 102 such that the image appears to be taken from the same angle as historical images captured at the same image capture location. For instance, if the historical images are all taken with a tilt of 0° relative to a plane orthogonal to a gravitational vector, but a gust of wind occurring when UAV 102 captured a new image caused the new image to be taken with a tilt of 5° relative to the plane, image modification unit 314 may rotate the new image −5° to ensure that the new image is from an angle consistent with the historical images. Similarly, historical images of the structure taken at a particular image capture location may be taken straight on at the structural bearing, but a camera of UAV 102 may be yawed or pitched 4° when taking a new image of the structure at the same image capture location. Accordingly, in this example, image modification unit 314 may apply a skew of −4° to the new image to correct for the yaw or pitch. Image modification unit 314 may determine the tilt, yaw, or pitch based on orientation data generated by UAV 102 at the times the images were captured.

Image analysis unit 316 may analyze images of a structure to determine whether the structure has changed positions. For example, image analysis unit 316 may obtain a first infrared image and a second infrared image taken at different times at the same image capture location. In this example, image analysis unit 316 may determine, based on an angle between the beam from the laser as shown in the first image and the beam from the laser as shown in the second image, a score for the second infrared image. Additionally, image analysis unit 316 may determine, based on the score for the second infrared image, whether a position of the structure has changed during a time interval between capture of the first infrared image and capture of the second infrared image, wherein the laser remains attached to the structure during the time interval. Furthermore, image analysis unit 316 may output an indication of whether the position of the structure has changed during the time interval.

Figure 4:
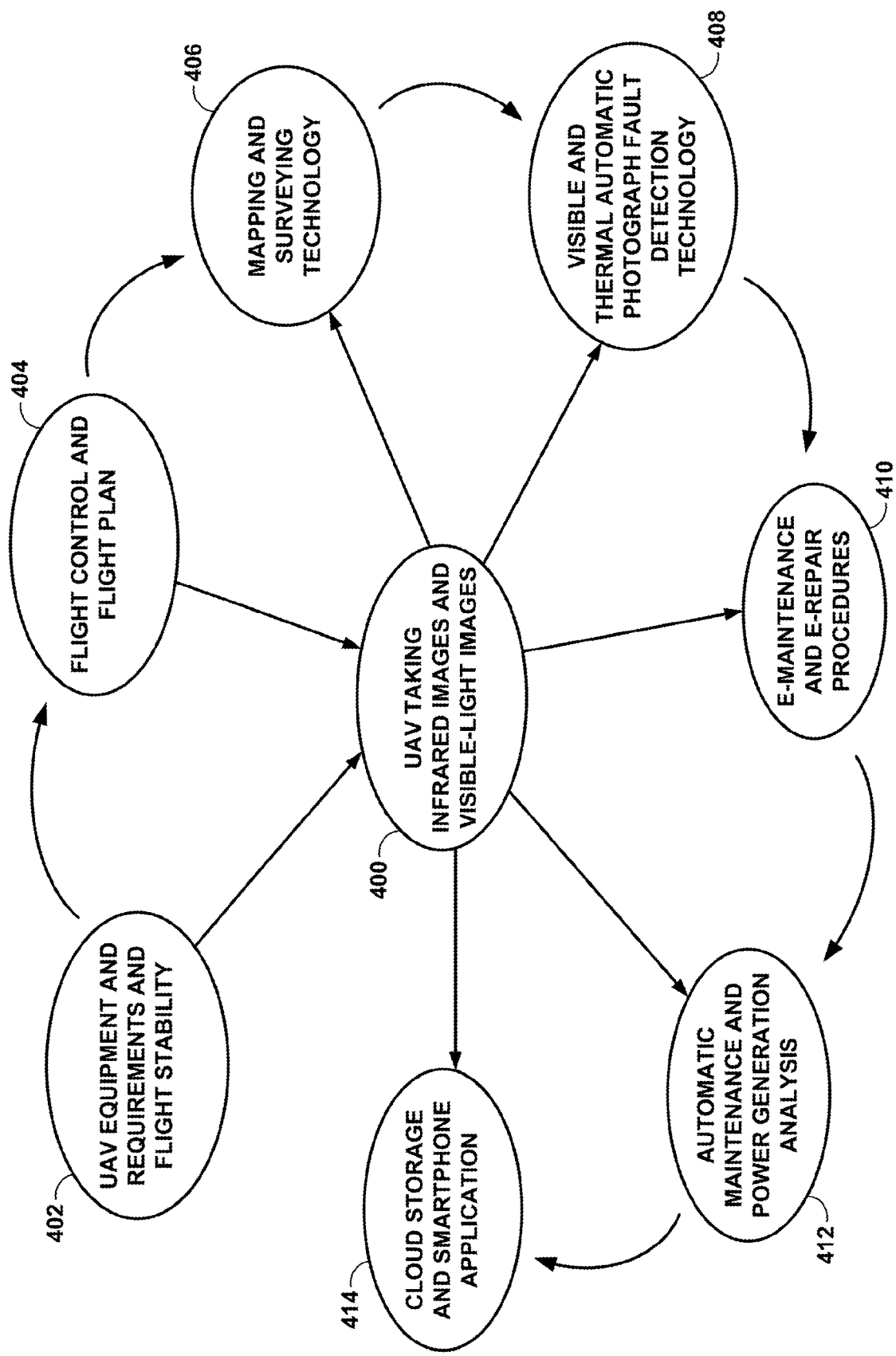
FIG. 4 is a block diagram illustrating autonomies of a solar panel inspection technique, in accordance with a technique of this disclosure.

FIG. 4 is a block diagram illustrating autonomies of a solar panel inspection technique, in accordance with a technique of this disclosure. The solar panel inspection technique may include a UAV capturing infrared images and/or visible-light images (400). The technique may include the functionality of pressing one button to finish an entire inspection mission. This one-button functionality may be based on the UAV equipment and requirements and flight stability (402) and the flight control and flight plan (404). The UAV may include a memory device configured to store a predefined route through the solar farm for the UAV to fly along during the inspection mission.

The memory device may also be configured to store predefined flight locations along the predefined route for capturing images. The predefined route and predefined flight locations may be based on a two-dimensional and/or three-dimensional mapping and surveying technology of the solar farm (406). The UAV may automatically capture images at the predefined flight locations and automatically transfer the captured images to a cloud computing device. Using the mapping technology, the UAV may be configured to determine the location of the UAV when each image is captured. Onboard processor 116, a FC computing system, and/or another computing system may further be configured to determine the location of each solar panel on the inspection route.

The cloud computing system may be configured to automatically detect faults in a solar panel based on visible-light images and/or infrared images (408). The cloud computing system may also be configured to carry out e-maintenance and e-repair procedures (410). The e-maintenance and e-repair procedures may include automatically assigning maintenance and repair tasks to workers. The e-maintenance and e-repair procedures may also include tracing the condition and maintenance status of a solar panel. The cloud computing system may be further configured to automatically analyze maintenance issues and power generation for the solar farm (412). The cloud computing system may perform e-reporting, by which the cloud computing system generates quarterly, half-year, and annual reports for company leaders or government officials. The cloud computing system may generate the reports based on the scores for solar panels, as well as the measured power generated by the solar panels.

Cloud computing system 106 may be configured to automatically generate reports without user input. Cloud computing system 106 may first create a report template and place it in a desired network directory. The template file may include the following information: time and date of inspection, person who performed the inspection or UAV that captured images, temperature and other environmental information during the inspection, total inspected area, power generation rate on inspection date, and any other notable events on the inspection date. Cloud computing system 106 may copy this information to the template file to populate the report document. Cloud computing system 106 may compare the current report to a previous report and highlight any differences between the two reports. Cloud computing system 106 may combine reports and data to form longer-term report, such as monthly and annual reports. Cloud computing system 106 may create an individual report for each inspection flight.

The cloud computing system may also be configured to store images and other data on a cloud network so that users can access the data from multiple devices (414). The cloud computing system may also be able to run an application that displays relevant data to users. The application may display locations and conditions of solar panels to users to aid in inspections, repairs, and maintenance. The application may display a fault area as a red or pink color. Yellow colors may indicate moderate temperatures, and green may indicate lower or regular operational temperatures. The application may also allow a user to zoom in on images of the solar panel so that the user can verify and check the fault. The application may allow the user an option of whether to view color images and black-and-white images.

Figure 5A:
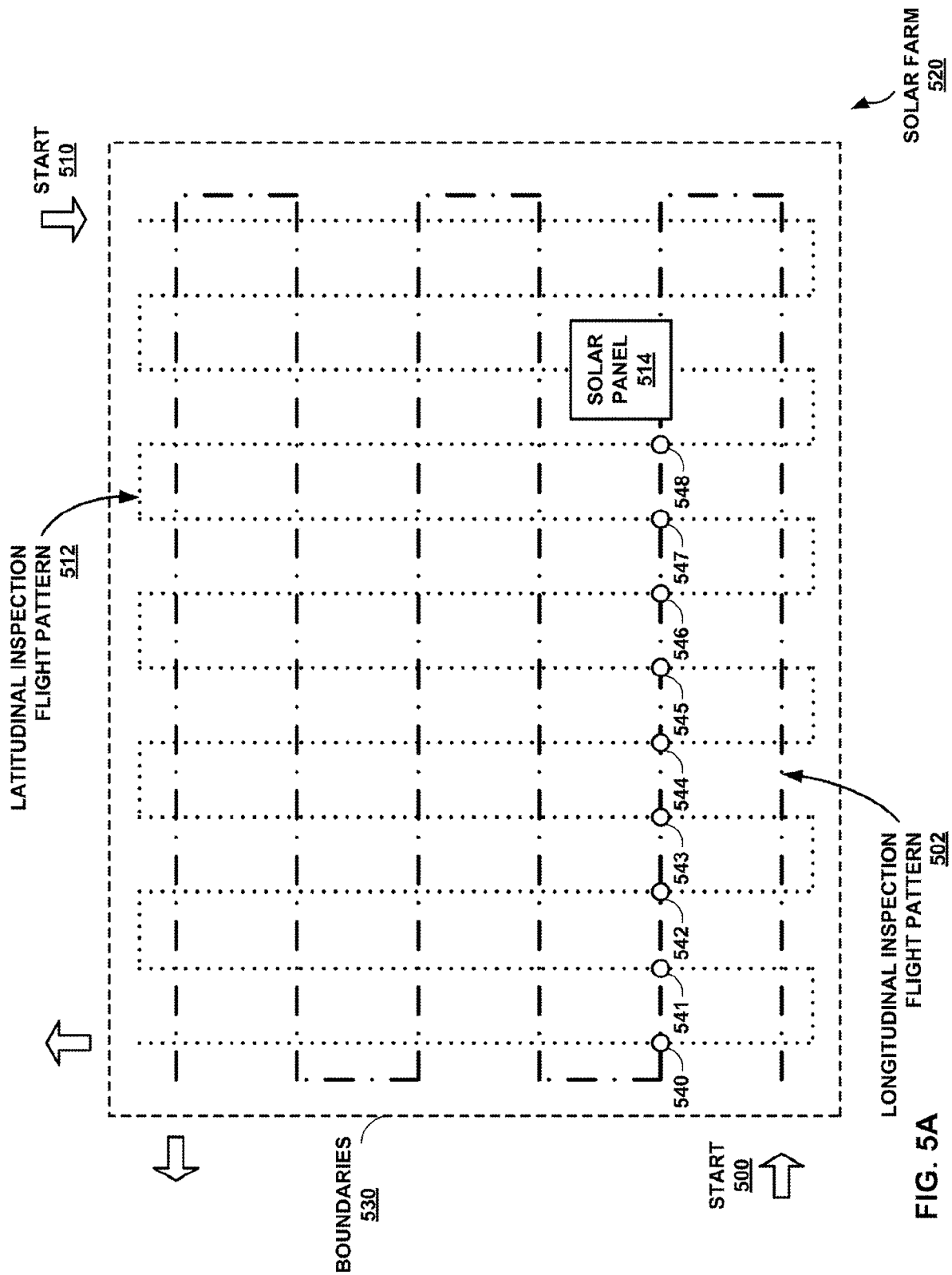
FIG. 5A illustrates solar panel inspection patterns in two directions, in accordance with a technique of this disclosure.

FIG. 5A illustrates solar panel inspection patterns in two directions, in accordance with a technique of this disclosure. Longitudinal inspection flight pattern 502 may originate at start location 500 and proceed east-west through solar farm 520. Latitudinal inspection flight pattern 512 may originate at start location 510 and proceed north-south through solar farm 520. Along both inspection flight patterns 502 and 512, a UAV may pass by all of the solar panels in solar farm 520, including solar panel 514. A memory device may be configured to store predefined flight locations 540-548 along inspection flight patterns 502 and 512 for the UAV to capture images.

Predefined flight locations 540-548 may align with a row of solar panels, including solar panel 514, in solar farm 520. When a UAV flies along longitudinal flight pattern 502, the UAV may pass over predefined flight locations 540-548 as the UAV flies down the row of solar panels. The UAV may automatically capture images of the solar panels in the row as the UAV reaches each of predefined flight locations 540-548. In some examples, a user may override the movements and/or image capturing of the UAV.

Onboard processor 116 and/or FC system 140 may store predefined flight locations 540-548 as three dimensions: latitude, longitude, and altitude. Onboard processor 116 and/or FC system 140 may also store the locations of the solar panels as three dimensions (x, y, z) because solar farm 520 may not be on level ground. All or part of solar farm 520 may be built on a hill or slope. As a result, onboard processor 116 and/or FC system 140 may cause UAV 102 to ascend or descend as UAV 102 flies through solar farm 520 in order to maintain desirable heights above the solar panels. Onboard processor 116 and/or FC system 140 may store altitude data for each of predefined flight locations 540-548 to control the vertical position of UAV 102 when UAV 102 captures images at each of predefined flight locations 540-548.

Onboard processor 116 and/or FC system 140 may determine a predefined route for a UAV by first determining boundaries 530 around solar farm 520. Boundaries 530 may form a geo-fence, where the control system of the UAV prevents the UAV from travelling outside of the geo-fence. Onboard processor 116 and/or FC system 140 may be further configured to determine a predefined route through solar farm 520 within boundaries 530. The predefined route may follow one of inspection flight patterns 502 and 512. Onboard processor 116 and/or FC system 140 may also be configured to determine predefined flight locations 540-548 along the predefined route for the UAV to capture images of solar panels. One of predefined flight locations 540-548 may be located near solar panel 514. Onboard processor 116 and/or FC system 140 may then be configured to transmit the predefined route and predefined flight locations 540-548 to the UAV by a wired connection such as USB, a storage device such as a thumb drive or SD card, and/or a wireless connection such as 3G, 4G, 5G, Wifi, or Bluetooth.

A UAV may be configured to perform an inspection manually, semi-automatically, or fully automatically. For a manual inspection, a user on the ground may pilot the UAV to the image capture locations. The user may control the taking of images, or the UAV may be programmed to automatically capture images when the UAV is in a suitable location. During a semi-automatic inspection, a processor on the UAV may control the flight path, but a user may override the automatic control of the UAV by using a remote control. During an automatic inspection, a processor on the UAV may command the UAV controls to follow the flight path. An automatic or semi-automatic inspection may be based on GNSS navigation and/or visual odometry. Navigation may include a certain height above ground (e.g., ten, twenty, or thirty meters), using ground speed from Kalman filtered GNSS signals in three dimensions, and/or compass and GNSS heading angles.

Figure 5B:
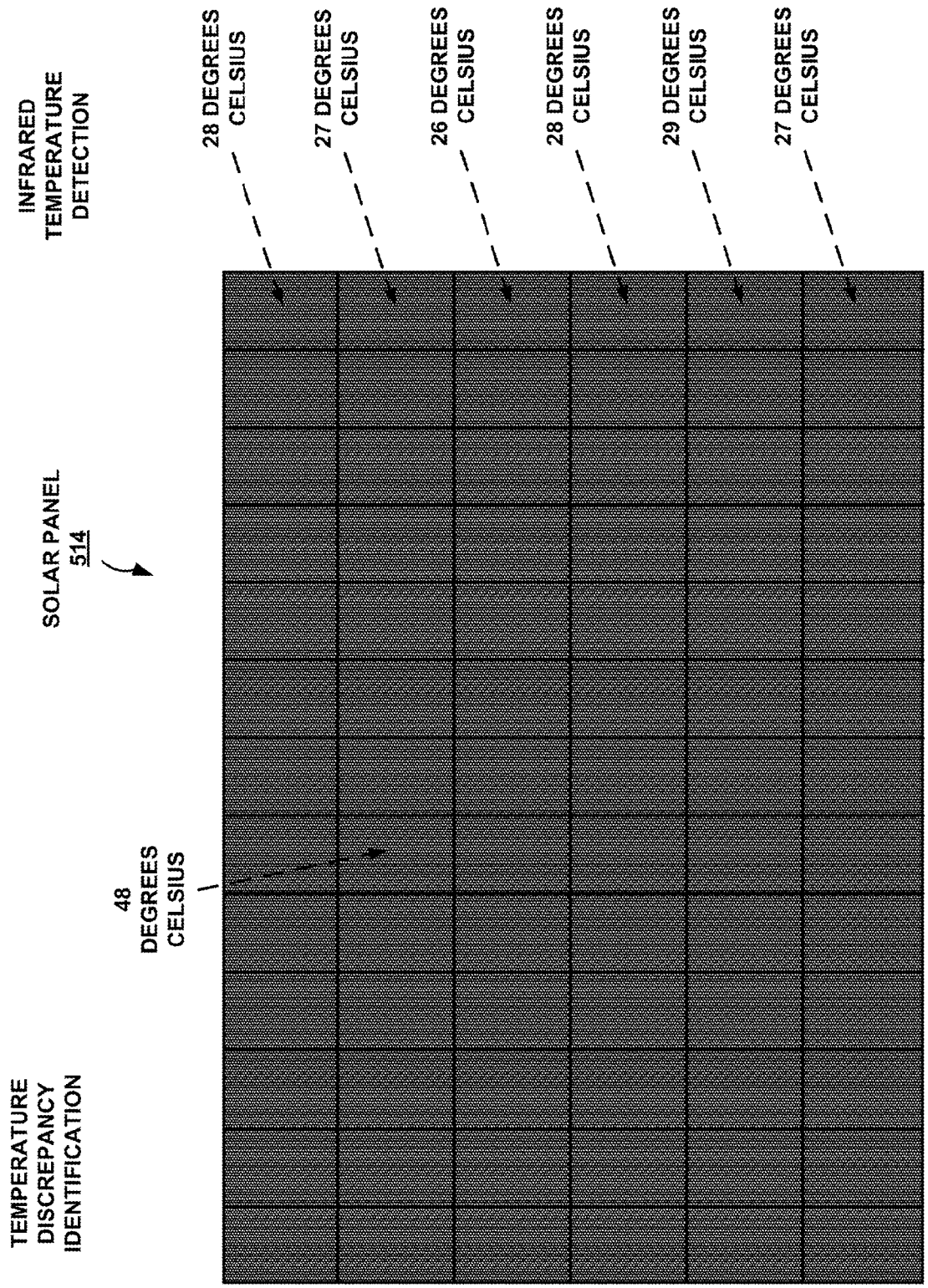
FIG. 5B illustrates an infrared camera image for solar panel discrepancy recognition and identification, in accordance with a technique of this disclosure.

FIG. 5B illustrates an infrared camera image for solar panel discrepancy recognition and identification, in accordance with a technique of this disclosure. Solar panel 514 includes seventy-eight segments arranged in six rows and thirteen columns. All of the segments have temperatures between twenty-five degrees Celsius and thirty degrees Celsius, except one segment that has a temperature of forty-eight degrees Celsius. The significantly higher temperature of the segment may indicate a fault.

Depending on the severity and the extent of the fault, cloud computing system 106 may recommend repair or maintenance for solar panel 514. Cloud computing system 106 may be configured to determine that there is a fault in the high-temperature segment based on an infrared image of solar panel 514. Cloud computing system 106 may be configured to determine a score for an image of solar panel 514 based on a temperature and/or color of solar panel 514 or just a temperature and/or color of a single segment of solar panel 514. Cloud computing system 106 may be configured to determine a fault based on the temperature and/or color of one segment exceeding a threshold temperature and/or a threshold color. If cloud computing system 106 determines an excessive temperature for solar panel 514, cloud computing system 106 may direct a UAV to return to solar panel 514 to capture another infrared image to confirm the fault. Cloud computing system 106 may also verify the determination of a fault based on the amount of electrical power generated by the string of solar panels that includes solar panel 514.

Cloud computing system 106 may use template matching and machine learning to determine a fault based on temperature and/or color discrepancies in images. Cloud computing system 106 may determine the average temperature of a solar panel and image colors. An infrared may show temperature discrepancies by color, and cloud computing system 106 may determine irregular temperature patterns based on template thermal patterns from stored infrared images.

Figure 6:
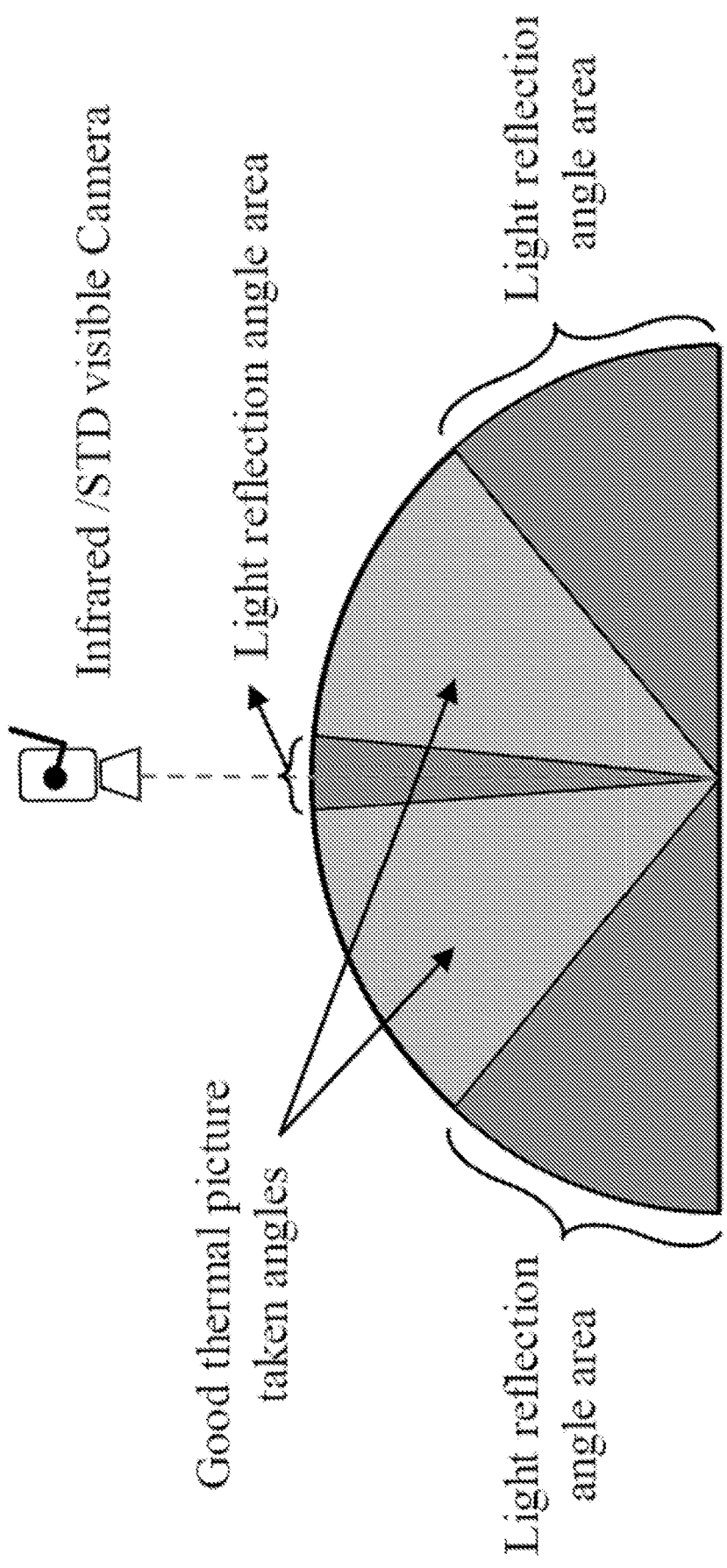
FIG. 6 is a diagram illustrating image capture angles, in accordance with a technique of this disclosure.

FIG. 6 is a diagram illustrating image capture angles, in accordance with a technique of this disclosure. Images captured by a UAV that is directly above the solar panel may not have good resolution of the solar panel because of light reflection. Similarly, images captured by a UAV that is at a low angle may not have good resolution of the solar panel because of light reflection. Images captured at forty degrees above horizontal to eighty degrees above horizontal may have good resolution. FIG. 6 is one example of desirable image capture angles. In some examples, image capture angles of less than forty or forty-five degrees above horizontal or more than eighty or eighty-five degrees above horizontal may be desirable. In general, solar panels in the northern hemisphere may be positioned at an angle of twenty to forty degrees from vertical towards the south.

Figure 7:
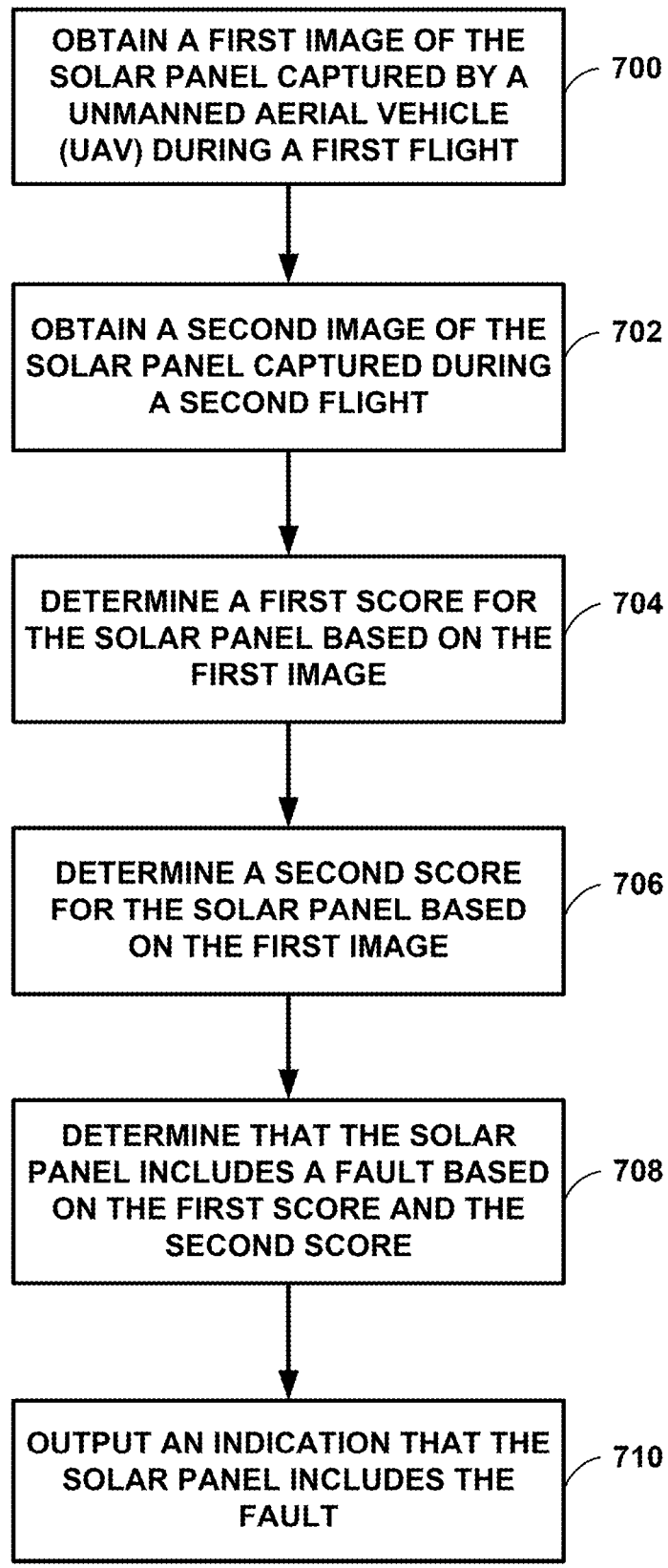
FIG. 7 is a flowchart illustrating an example operation for detecting a fault in a solar panel, in accordance with a technique of this disclosure.

FIG. 7 is a flowchart illustrating an example operation for detecting a fault in a solar panel, in accordance with a technique of this disclosure. For instance, the operation of FIG. 7 may be used to detect a fault in structure 114 (FIG. 1), and solar panel 514 (FIGS. 5A and 5B).

In the example of FIG. 7, computing system 106 may obtain a first image of structure 114, which may be a solar panel, captured by a UAV (e.g., UAV 102 of FIG. 1 and FIG. 2) during a first flight (700). Cloud computing system 106 may also obtain a second image of structure 114 captured by the UAV during a second flight (702). Structure 114 may include one or more elements of a solar panel assembly, including the mechanical elements, wires, transformers, circuit breaker boxes, towers, the ground, and nearby vegetation. Cloud computing system 106 may obtain the images in various ways. For example, cloud computing system 106 may retrieve the images from a local or remote image archive, such as image archive 312 (FIG. 3). In some examples, cloud computing system 106 may obtain the images directly from a UAV. The transfer of images may occur over a wired or a wireless connection, such as an SD card, ethernet, USB, Wifi, 3G, 4G, 5G, and/or Bluetooth.

Additionally, cloud computing system 106 may determine a first score for structure 114 based on the first image (704). For example, cloud computing system 106 may determine the score for the first image as being equal to the maximum temperature of structure 114. In some examples, cloud computing system 106 may be configured to determine a score for another element of the solar panel assembly, such as the wire connections. Cloud computing system may also be configured to determine a score for ground erosion and overgrowth of vegetation. Furthermore, in the example of FIG. 7, the cloud computing system may determine a second score for structure 114 based on the second image (706). The scores may be based on the temperature and/or color of structure 114 or any visible flaws on structure 114. In addition, cloud computing system 106 may determine a score based on the intensity of light emitted by structure 114 during an electroluminescence test.

Cloud computing system 106 may determine that structure 114 includes a fault based on the first score and the second score (708). Cloud computing system 106 may also output an indication that the solar panel includes a fault (710). The indication may include a graphical icon on a graphical user interface, where the graphical icon may indicate the location and condition of the solar panel. Cloud computing system 106 can also output an indication of faults in other elements of the solar panel assembly as graphical icons. The graphical icons may include information about which element has a fault so that a worker can find the target element.

Figure 8:
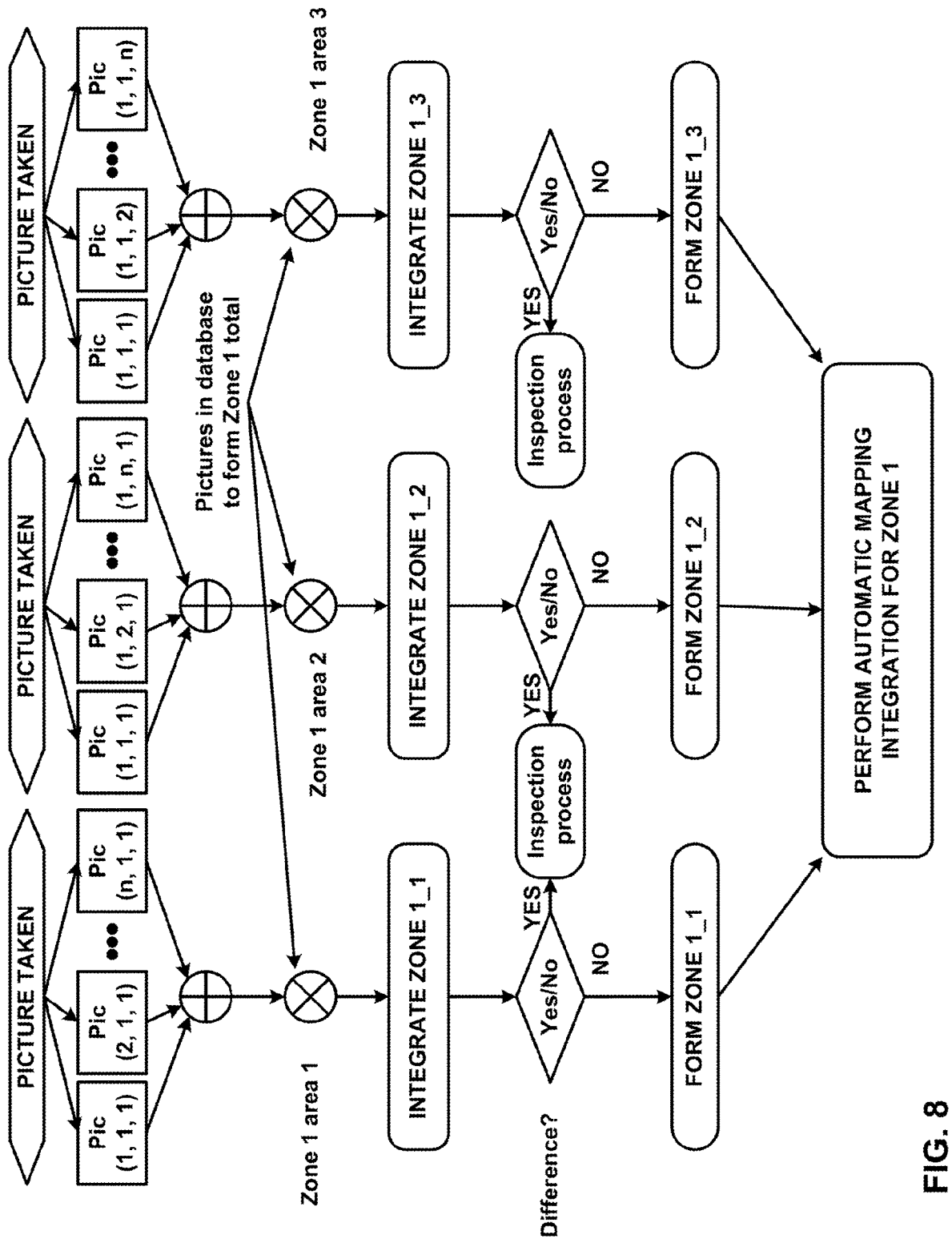
FIG. 8 is a conceptual diagram illustrating a technique for automatically mapping a solar farm, in accordance with a technique of this disclosure.

FIG. 8 is a conceptual diagram illustrating a technique for comparing pictures, in accordance with a technique of this disclosure. In the example of FIG. 8, a UAV captures a plurality of images at various image capture locations. The image capture locations are identified by (x, y, and z) coordinates. For example, the UAV may capture images (i.e., take pictures) at locations (1, 1, 1), (2, 1, 1), etc., as shown in the example of FIG. 8, in a single session. The captured images may include x-direction images, y-direction images, and z-direction images. The x-direction images include images that have the same y and z coordinates, but different x coordinates. The y-direction images include images that have the same x and z coordinates, but different y coordinates. The z-direction images include images that have different x and y coordinates, but different z coordinates. The captured images are then stored in a database, as shown by the circles marked with a plus sign. In some examples, the captured images are transferred to a predetermined cloud server using 3G, 4G, 5G, NBIOT, or another wireless technology for evaluation. Using these two storage techniques may help guarantee safe storage of the captured images.

In the example of FIG. 8, for each image, cloud computing system 106 may retrieve from a database (e.g., image archive 312 (FIG. 3)) images having the same coordinates as the image, but taken at times prior to a time of the session during which the images corresponding to the "PICTURE TAKEN" boxes of FIG. 8 were captured. Retrieval is denoted in FIG. 8 by the circles containing X marks. For example, for an image taken from an image capture location with coordinates (2, 1, 1), computing system 106 may retrieve from the database (which may be located on an SD card, a cloud server, or other location) a historical image taken from the image capture location with coordinates (2, 1, 1). Cloud computing system 106 may then compare the two corresponding images. If there is a significant difference between the corresponding images, an inspection process of the structure may be performed. Otherwise, no further action is taken until a next flight of the UAV to test whether the structure has a fault. The inspection process of the structure may be performed in various ways. For example, the inspection process of the structure may be offline, online, or semi-online. When the inspection process is offline, inspection of infrared images and inspection of visible-light images are performed manually. When the inspection process is online, inspection of infrared images and inspection of visible-light images are performed automatically by cloud computing system 106. When the inspection process is semi-online, inspection of infrared images and inspection of visible-light images is performed automatically by cloud computing system 106, but a human worker checks the results of the inspections and provide scheduling of tasks for fixing or maintaining the structure. In the example of FIG. 8, cloud computing system 106 may perform this process for each of the x-direction images, y-direction images, and z-direction images.

Cloud computing system 106 may perform automatic mapping integration for a zone of a solar farm to determine whether a set of images can cover the entire solar farm. For larger solar farm, a UAV may not be able to capture images of the entire solar farm during a single flight mission. Therefore, cloud computing system 106 may need to stitch together multiple sets of images to form a full model of the solar farm.

FIG. 9 illustrates a score decision chart for detecting a fault in a solar panel, in accordance with a technique of this disclosure. Cloud computing system 106 may use such a chart to determine whether a solar panel has a fault based on the percentage of visible-light images and infrared images with scores that exceed a threshold. In the example of FIG. 9, a UAV may capture both visual light pictures (i.e., standard pictures) of a structure and infrared images of the structure.

In some examples, cloud computing system 106 may determine whether a solar panel has a fault based on only one type of images (e.g., visible-light images and infrared images). Cloud computing system 106 may obtain a set of at least two images of the solar panel. Cloud computing system 106 may then determine a set of scores for the solar panel based on the set of images. Cloud computing system 106 may be configured to assign a score to each image by, for example, determining the temperature(s) and/or color(s) of the solar panel in each infrared image or determining if there are any visible discrepancies on the solar panel in each visible-light image. Cloud computing system 106 may then be configured to determine whether each score exceeds a threshold score, which may represent a temperature and/or color for infrared images or a magnitude of discrepancies (e.g., a size of debris on the solar panel) in a visible-light image. Cloud computing system 106 may be further configured to compare the percentage of scores that exceeds the threshold score to a threshold percentage of scores. As shown in FIG. 9, there may be more than one threshold percentage, such as two percent, five percent, ten percent, twenty percent, etc. If cloud computing system 106 determines that the percentage of scores exceeds a threshold percentage, then cloud computing system 106 may determine that the solar panel needs maintenance (e.g., cleaning, washing), needs repair (e.g., fix a mechanical flaw in a portion of the solar panel), or need replacement.

In some examples, cloud computing system 106 may be configured to determine a single score for a visible-light image and an infrared image that are captured at the same time. Cloud computing system 106 may be configured to determine a first score based on a first visible-light image and a first infrared image of the solar panel captured at a first time (e.g., on a first day). Cloud computing system 106 may be configured to determine a second score based on a second visible-light image and a second infrared image captured at a second time.

Cloud computing system 106 may compare images in a new batch of images of a solar panel to determine whether the solar panel has a fault, as described elsewhere in this disclosure. Analysis of the new batch of images may reveal that only some of the images in the new batch of images show a fault in the solar panel (i.e., that an image is out of specification). If the percentage of images showing movement of the structure is sufficiently small, it is likely that the solar panel does not actually have a fault, or the fault may have little effect the solar panel power generation. A fault in a solar panel may not always be substantial enough to change the power generation of the solar farm. A system of this disclosure may aid in detecting small faults in a solar farm. Alternatively, when the percentage of images showing a fault in the solar panel is within particular percentage bands, it may be high-likely that maintenance or repair is needed for the solar panel.

In the example of FIG. 9, an image is considered to be "out of spec" if the image has a score that is outside an acceptable range. For example, an "out of spec" image may show a sufficiently great discrepancy for the characteristics of the solar panel from the expected characteristics. For example, an infrared image may be considered to be "out of spec" if the infrared image shows a temperature and/or color for a portion of the solar panel that exceeds an acceptable temperature threshold and/or an acceptable color threshold. In another example, a standard, visible-light image may be considered to be "out of spec" if the image shows cracks, spalling, warping, or bending of the solar panel, debris accumulations (e.g., dust, metal shavings, rust flakes, bird fecal matter), and so on.

Cloud computing system 106 may determine whether the solar panel is in good condition, whether the solar panel needs maintenance, whether the solar panel needs repair, or whether the ground level of the solar panel is out of specification based the percentage of standard images of the solar panel are "out of spec" and the percentage of infrared pictures of the solar panel are "out of spec." For instance, in the example of FIG. 9, if the number of standard images of the solar panel that are "out of spec" is less than 2% and the number of infrared images of the solar panel that are "out of spec" is also less than 2%, then cloud computing system 106 may determine that the solar panel is in good condition. Similarly, in the example of FIG. 9, if the number of standard images of the solar panel that are "out of spec" is less than 2% and 2% to 5% of infrared images of the solar panel that are "out of spec", cloud computing system 106 may determine that the solar panel needs maintenance. In other examples, percentages other than those shown in the example of FIG. 9 can be used.

If cloud computing system 106 determines that the solar panel is in good condition, cloud computing system 106 may continue to monitor the status of the solar panel, which is referred to herein as "traceability." Cloud computing system 106 may be configured to trace the status of the solar panel by saving images and scores associated with the solar panel to determine whether to indicate that the solar panel needs maintenance, repair, or replacement. In some examples, cloud computing system 106 may be configured to monitor the amount of electrical power generated by a string of solar panels to determine whether any of the solar panels in the string has a fault. Cloud computing system 106 may lower the threshold(s) for the solar panels in a string if the (daily, weekly, monthly, quarterly, bi-annually, or annually) electrical power generation rate is below a predefined ratio, such as sixty percent or fifty percent. A normal power generation rate may eighty percent, for example, so a decrease in the power generation rate below the predefined ratio may indicate a fault somewhere in the string.

The threshold score(s) and the threshold percentage(s) may be based on estimates of the performance of the solar panel. For example, a small amount of dust may not appreciably affect the amount of energy generated by the solar panel. Thus, cloud computing system 106 may be configured to assign a relatively small weight to a speck of dust and a relatively large amount of weight to bird droppings on the solar panel, which may cause damage to the solar panel if not removed quickly. A customer may be able to change the percentages shown in FIG. 9 to achieve higher power generation efficiency or lower maintenance costs and repair times.

Figure 10:
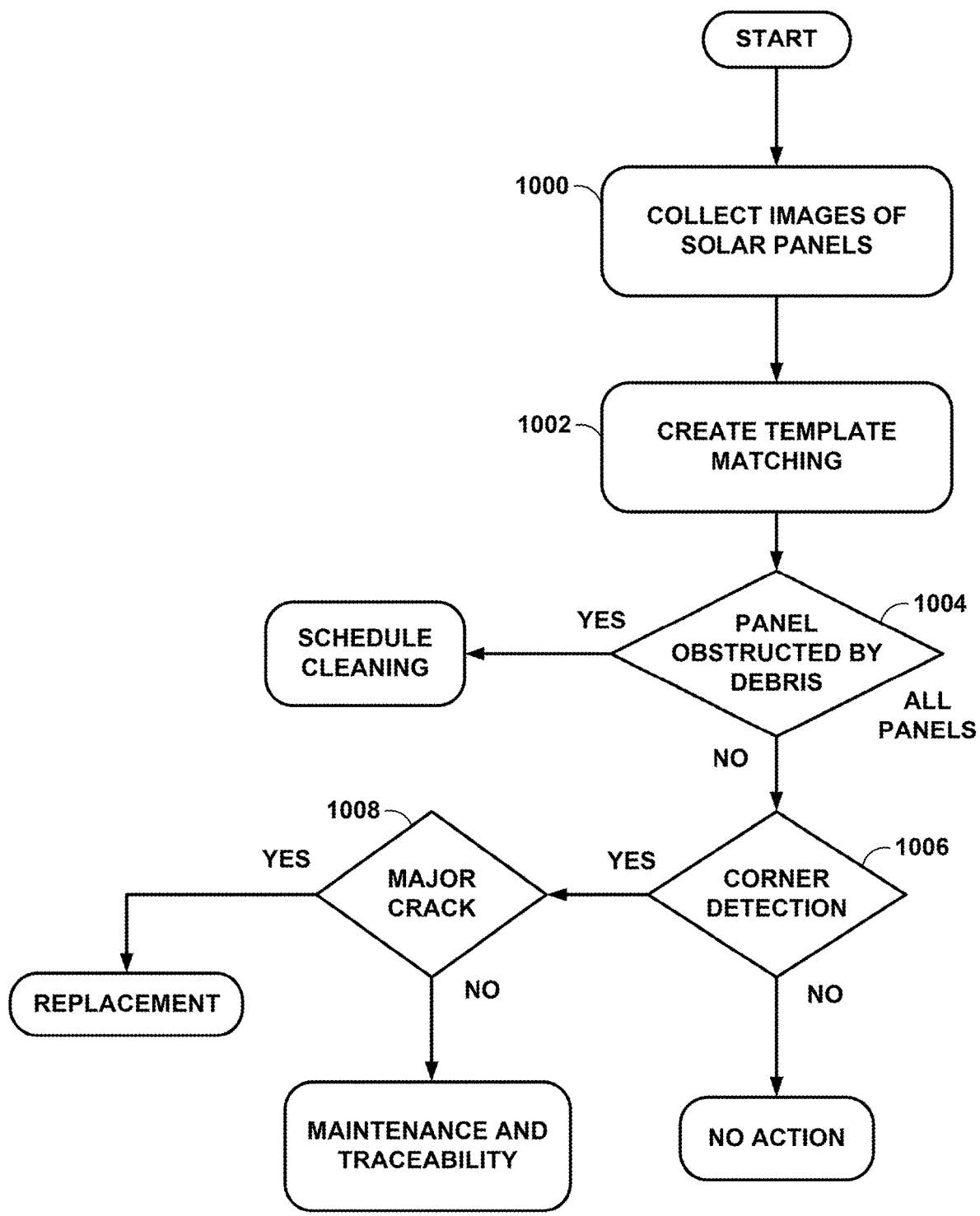
FIG. 10 is a flowchart illustrating a visible-light image control algorithm for fault classification, in accordance with a technique of this disclosure.

FIG. 10 is a flowchart illustrating a visible-light image control algorithm for fault classification, in accordance with a technique of this disclosure. Cloud computing system 106 may first collect images and use template matching to create a model of the solar farm (1000, 1002). Cloud computing system 106 may use template matching to match images to solar panels. Cloud computing system 106 may schedule a cleaning immediately if an image shows a solar panel is obstructed by debris (1004).

Cloud computing system 106 may then use corner detection to determine if there is a major crack in a solar panel (1006, 1008). Major cracks may be more likely to occur at the corners of a solar panel. A corner detection algorithm may define a corner of a solar panel or another structure as a point with low self-similarity. The algorithm test of each pixel in the image to see if a crack corner is present, by considering how similar a patch centered on the pixel is to nearby, largely overlapping patches. Therefore, small, minor, and major issues on a solar panel can be implemented with template matching method from the images.

The tasks of the above four groups of inspection status (good, cleaning, maintenance, replacement) will be assigned to individual solar panel workers by using a manual or automatic process and procedure. The solar panel station supervisor or manager may act as the first level of manager system to provide task assignment for individual worker daily assignment. The upper managers can monitor the entire maintenance and repairing tasks using web portal technology. The entire working process may be based on a web-based system. Users may access the information regarding a solar panel via a software application so that the entire solar panel maintenance and repair status can be observed by user online on mobile devices. The system may also include the ability to easily generate monthly, quarterly, half-year and annual status reports.

Figure 11:
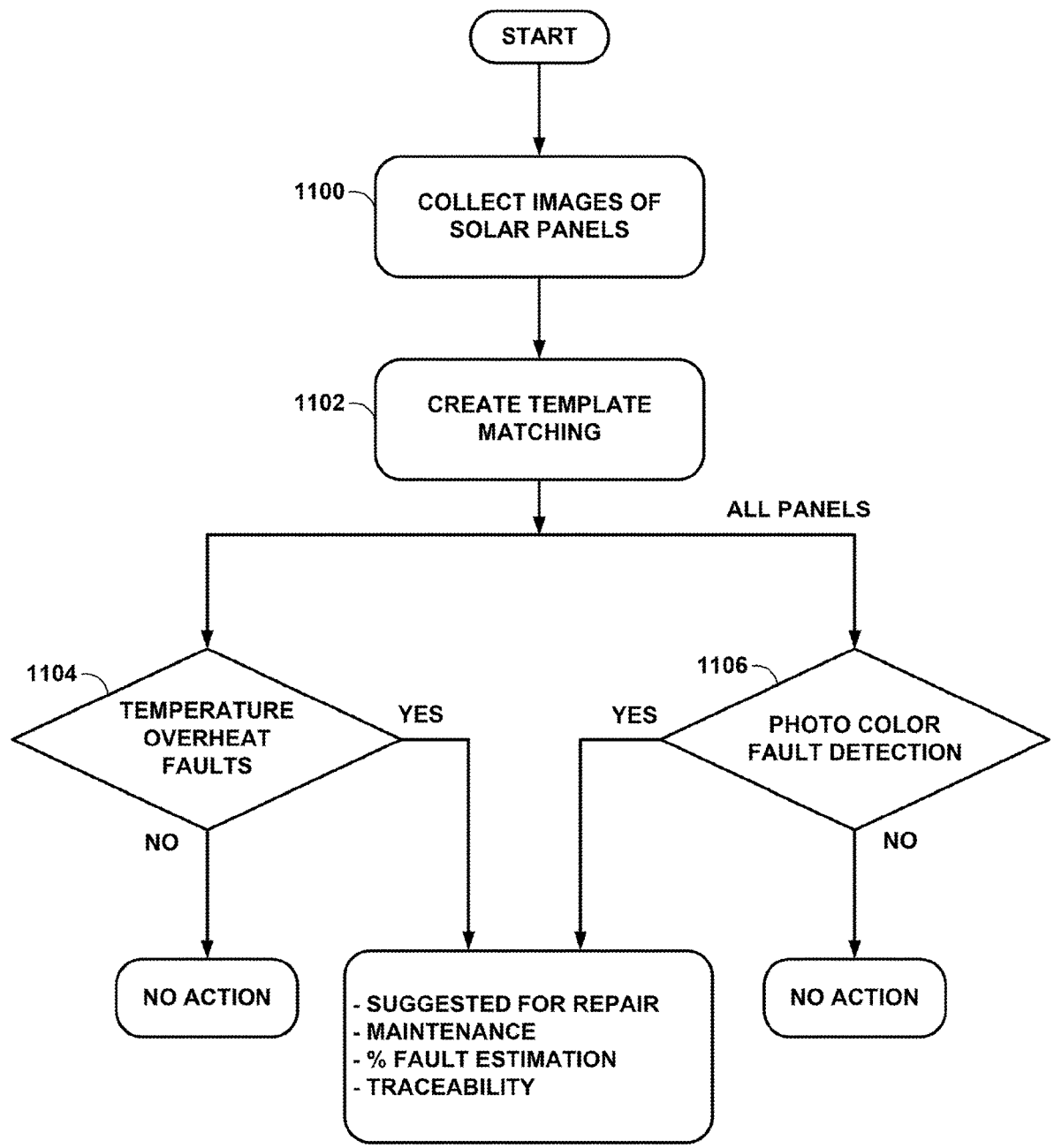
FIG. 11 is a flowchart illustrating an infrared image control algorithm for fault classification, in accordance with a technique of this disclosure.

FIG. 11 is a flowchart illustrating an infrared image control algorithm for fault classification, in accordance with a technique of this disclosure. The system will give suggestions based on recognized temperature and color differences in infrared images. For example, if an entire solar panel module is warmer than usual that might indicate interconnection problems. If individual cells or strings of cells are showing up as a hot spot or a warmer "patchwork pattern," the cause may be defective bypass diodes, in internal short-circuits, or in a cell mismatch. Shadowing and cracks in cells may show up as hot spots or polygonal patches in the thermal image. The temperature rise of a cell or of part of a cell indicates a defective cell or shadowing.

The identification of faults based on temperatures and/or colors in infrared image may include threshold logic. For example, if the measured temperature of the panel exceeds a predefined value by twenty degrees Celsius, cloud computing system 106 may determine that the panel is overheated and generate a message to inform the user to replace the panel. If the measured temperature is closer to a predefined threshold by five degrees Celsius, cloud computing system 106 may determine that the panel is in good or normal condition and no maintenance is required. If the measured temperature exceeds a predefined threshold by ten degrees Celsius, cloud computing system 106 may assign the panel for further inspection by a technician. The technician may make a maintenance decision offline. There may be four statuses: repair, maintenance, percentage of fault estimation, and traceability. Cloud computing system 106 may assign minor cracks to the maintenance and traceability status category.

One method of inspecting solar panels includes electroluminescence testing for the purpose of detail diagnostics. Solar panel electroluminescence test relies on the same principle as testing a light emitting diode (LED). In order to have the solar farm to perform electroluminescence testing, a low power back-feed switching design may be installed in the solar panel station first. The switch will be designed to allow the individual solar panel zone to be turned on or off for the electroluminescence test. During the electroluminescence test, the solar panel transfers from generating power to consuming electrical energy. Because of this reverse design, the solar panel act as an LED and emit light that can be detect with a visible-light image.

Using the brightness and darkness on the solar panel by a special electroluminescence camera, cloud computing system 106 can determine the quality status of the solar panel. The peak brightness of solar panel in an electroluminescence test may be around the current of one hundred nano-amperes as Gaussian distribution chart, but individual solar panel producers may have different design methods and electrical current levels. Therefore, the desired electrical current for an electroluminescence test in a solar farm may be five hundred milliamperes, one ampere, two amperes, or four amperes. The electrical voltage may be twelve, twenty-four, or forty-eight volts of direct-current electricity.

The electroluminescence test may work best with a higher resolution camera up to 6000×4000 pixels, but lower resolution infrared cameras can be used in an electroluminescence test. Therefore, a standard infrared camera with 640× 480 pixels may be used for thermal electroluminescence inspection if the test uses larger viewpoints of individual solar panels with low-power injection. Nighttime inspection, especially with no moonlight, is best for electroluminescence testing. Electroluminescence testing is a good solar panel fault detection method to detect faults such as cracks and failed portions of the solar panel. When solar cells have aged, electroluminescence testing may be a good way for photovoltaic modules to become more efficient at solar energy conversion. Electroluminescence testing may detect structural defects, the quality of crystalline lattices, and the quality of overall encapsulates.

When back-fed current is induced in a set of solar panels, the solar panels will generate electroluminescence (i.e., light). Electroluminescence of the solar panel will lead to one of these results: standard emission implemented no fault, weak emission in the near infrared (NIR) to detect shunts, crystalline defects, and broken finger electrodes that may have occurred during cell manufacturing process.

Environment brightness will interfere with the electroluminescence test, so it may be desirable to perform the electroluminescence test at night with little or no moonlight. It may also be desirable to perform the electroluminescence test with no rain or low humidity conditions. An electrical storage system can provide the current to drive the solar panels into electroluminescence mode. The solar cell is essentially a large diode, and radiative recombination of carriers causes light emission. Using an infrared camera, the solar panel status can be captured. Cloud computing system 106 may use the infrared images to determine individual solar panel faults and/or defects due to age or manufacturing error. Cloud computing system 106 may use software template matching technology to automatically provide the correct suggestions of repair or maintenance to users.

As an indirect bandgap semiconductor, most of the recombination in silicon occurs via defects or Auger recombination. The amount of band-to-band recombination producing radiative emission may be relatively low. However, there may be a small amount of radiative recombination that happens even in silicon and this signal can be sensed using an external detector. The technique requires electrical contact and so can only be used once the metallization has been applied and the cell is substantially complete. Electroluminescence testing may provide a wealth of data about the area-related uniformity of solar cells and modules.

If a solar panel plant has power feed-back switching equipment for electroluminescence test, cloud computing system 106 can use the standard UAV flight plan and thermal camera triggering/scanning system. Cloud computing system 106 may also use the entire solar field and three-dimensional mapping technology to perform the electroluminescence test. To fully integrate every piece of data together, the solar panel electroluminescence test can be set in the radio controller and/or on ground control station with a special button. Once this solar panel station electroluminescence button is switched on, cloud computing system 106 may automatically perform the electroluminescence test with a UAV flight plan and camera triggering functions can be started. A checklist of the clearance of individual testing step can be designed, so that cloud computing system 106 can accomplish the entire test automatically. Based on the electroluminescence test, cloud computing system 106 may determine internal faults, structural faults, faults due to usage, and/or faults due to manufacturing defect.

Cloud computing system 106 may be configured to determine a score for a solar panel by at least determining a light intensity emitted by the solar panel during a first electroluminescence test in a first image. A low light intensity may indicate a fault such as a crack, a broken electrical connection, or another fault. Cloud computing system 106 may assign a higher score to indicate a possible fault based on a lower light intensity. Cloud computing system 106 may then be configured to determine the second score for the solar panel by at least determining a second light intensity emitted by the solar panel in a second image during a second electroluminescence test. The second electroluminescence test may occur on a different day than the first electroluminescence test. The electroluminescence tests may occur at nighttime during a time with less moonlight (e.g., a cloudy night and/or a new moon).

Figure 12:
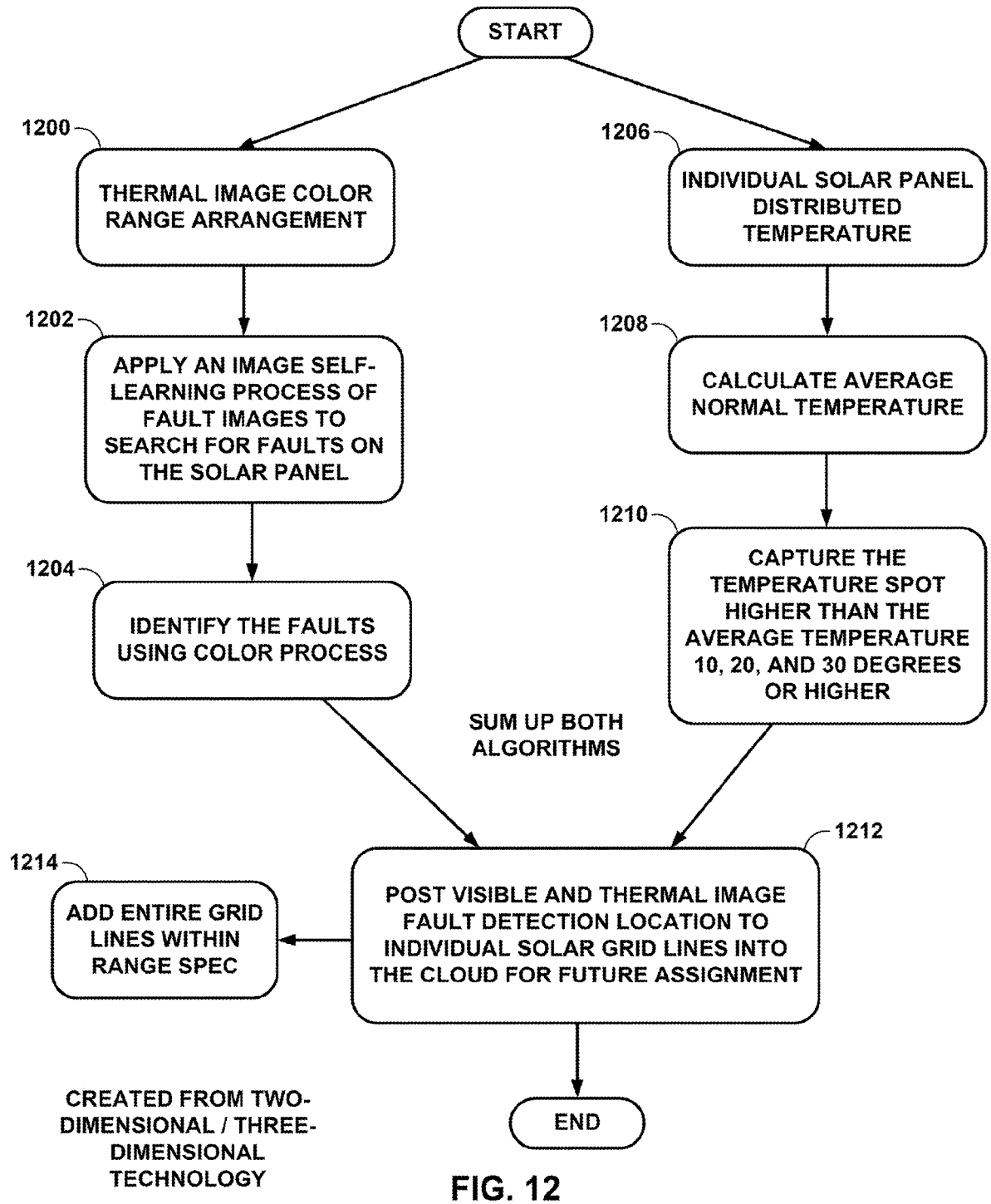
FIG. 12 is a flowchart illustrating mapping and combining visible-light and infrared images for fault detection, in accordance with a technique of this disclosure.

FIG. 12 is a flowchart illustrating mapping and combining visible-light and infrared images for fault detection, in accordance with a technique of this disclosure. On the infrared images, two kinds of comparison algorithms can be used. The first algorithm is based on infrared image light emphasis and density. The second algorithm is based on the infrared image temperature. In the first algorithm, cloud computing system 106 determines a color range for each image of a solar panel (1200). Cloud computing system 106 may then be configured to apply a self-learning process or machine-learning algorithm to detect faults on a solar panel across two or more images of the solar panel (1202). Cloud computing system 106 may determine faults based on colors that indicate temperature discrepancies (1204). Cloud computing system 106 may analyze the temperatures and/or colors in the infrared images to determine the condition of a solar panel.

In the second algorithm, an infrared image camera will generate two kinds of data: location data and individual distributed temperatures based on infrared images (1206). Since the infrared image temperatures are distributed, the individual solar panel average temperature can be computed (1208). Cloud computing system 106 may then automatically calculate temperatures for the entire solar panel farm with outside weather temperatures used as the normal temperature of a single solar panel set. Cloud computing system 106 may use the average temperatures and normal temperatures for all of the solar panels as the basis for recognizing irregular temperatures.

If parts of the solar panel are hotter than other parts, the warm areas will show up clearly in the infrared image (1210). Depending on the shape and location, the hot spots and areas can indicate several different faults. Cloud computing system 106 may use an algorithm to provide a health diagnostic to determine whether the solar panel is normal or off-normal in temperature. Cloud computing system 106 may be configured to provide users with an indication of whether the identified "off-normal" solar panel requires further screening or maintenance. Cloud computing system 106 may sum up the results of both algorithms and post the fault locations to the cloud network for assignment to users. Cloud computing system 106 may cause a mobile device to present indications of the fault locations to a user by presenting a graphical user interface to the user (1212). The graphical user interface may include grid lines for the entire solar farm, where each image location is positioned on a grid line (1214).

Cloud computing system 106 may give suggestions based on recognized temperature differences. For example, if an entire module is warmer than usual, this condition might indicate interconnection problems for the module. If cloud computing system 106 determines that individual cells or strings of cells have a hot spot or a warmer "patchwork pattern," the cause may be a defective bypass diode, internal short circuit, or a cell mismatch. Cloud computing system 106 may determine that a solar panel has shadowing and cracks in cells based on hot spots or polygonal patches in the thermal image. The temperature increase of a cell or of part of a cell may indicate a defective cell or shadowing.

The identification of faults based on temperatures may be based on threshold logic. For example, if the measured temperature of the panel exceeds a predefined value by twenty degrees Celsius, cloud computing system 106 may determine that the panel is an overheated panel and generate a message to inform a user to replace the panel. If the measured temperature is closer to a predefined threshold by five degrees Celsius, cloud computing system 106 may classify the panel as a normal panel and not recommend maintenance. If the measured temperature exceeds a predefined threshold by ten degrees Celsius, cloud computing system 106 may recommend the solar panel for further inspection by a technician who can decide the appropriate type of maintenance offline.

Figure 13:
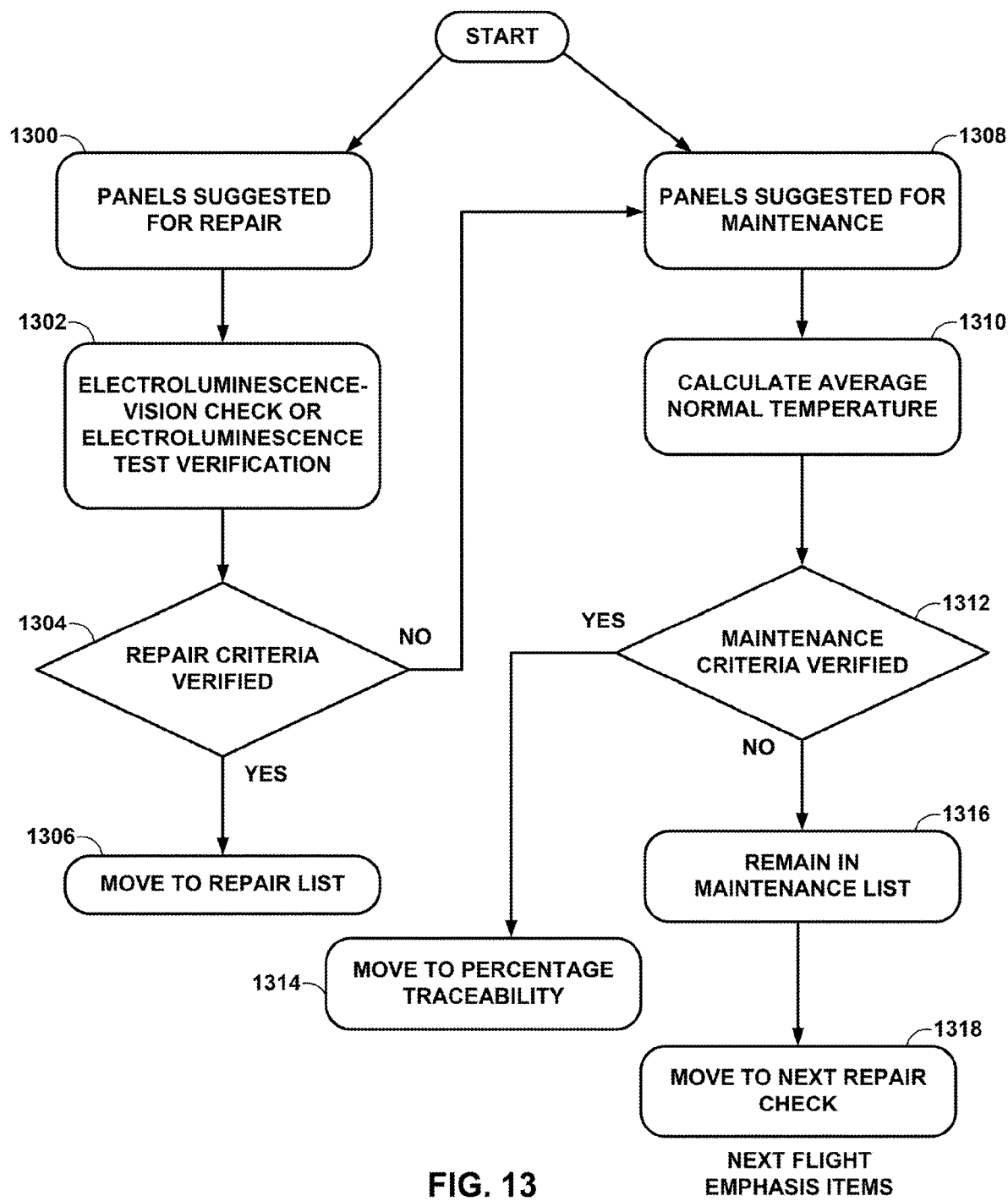
FIG. 13 is a flowchart illustrating task management for repair, maintenance, and traceability, in accordance with a technique of this disclosure.

FIG. 13 is a flowchart illustrating task management for repair, maintenance, and traceability, in accordance with a technique of this disclosure. Cloud computing system 106 may be configured to determine whether a solar panel should have a repair (1300) or maintenance (1308) based on scores assigned to images (see, e.g., FIG. 9). If cloud computing system 106 determines that a solar panel needs repair, cloud computing system 106 may be configured to double-check by analyzing electroluminescence-vision or an electroluminescence test (1302). If cloud computing system 106 verifies that a repair is needed (1304), then cloud computing system 106 will move the solar panel to a repair list (1306). Thus, the solar panel will remain in the repair basket because of damage, exceeding a threshold score, and/or internal discontinuities.

If cloud computing system 106 determines that a repair is not needed, cloud computing system 106 may be configured to move the solar panel to the maintenance list (1308) and calculate the average normal temperature of the solar panel based on infrared images (1310). FIG. 5B shows an example of a temperature discrepancy on a portion of a solar panel. If cloud computing system 106 verifies the maintenance criteria (1312), cloud computing system 106 may then move the solar panel to the traceability list for further monitoring. Verifying maintenance criteria may include checking the solar panel to determine if maintenance is needed. For example, a user may look at an image to determine if the visible defect is a leaf or another object that may no longer be on the solar panel. If the user determines that the visible defect is an object that is stuck to the solar panel, such as bird droppings or mud, the user may flag the solar panel for cleaning.

Factors for determining whether to place a solar panel in the traceability list include the percentage of portions of the solar panel that are damaged, the likelihood that the solar panel will degrade the performance of an entire region of solar panels, and the possibility for fire, smoke, eruption, or explosion of the solar panel. If cloud computing system 106 does not verify the maintenance criteria, then cloud computing system 106 may keep the solar panel in the maintenance basket (1316) and move to the next repair item (1318). Cloud computing system 106 may then move on to considering the next flight emphasis items (e.g., subsequent solar panels).

Figure 14:
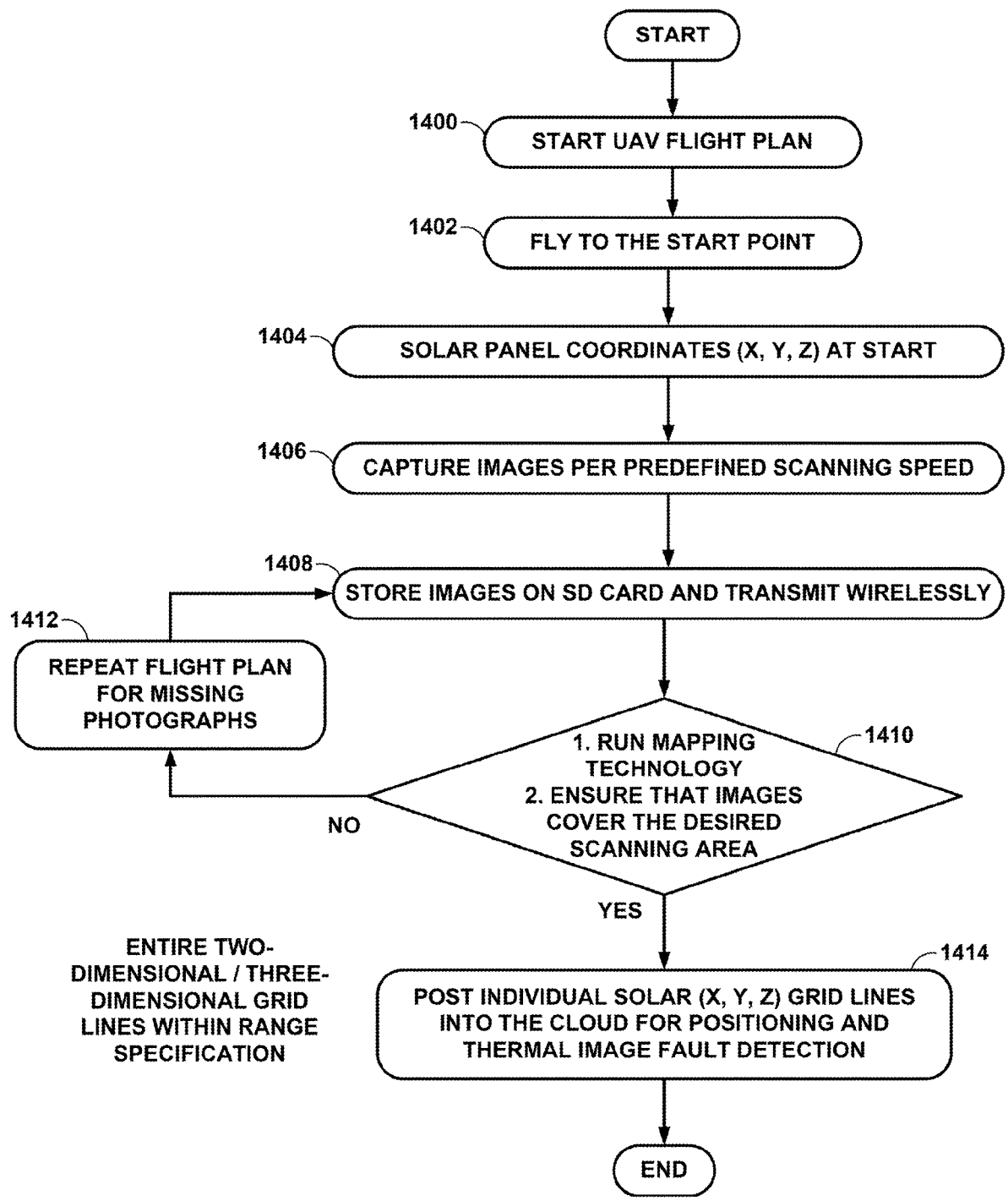
FIG. 14 is a flowchart illustrating verification control algorithm for two-dimensional/three-dimensional mapping technology, in accordance with a technique of this disclosure.

FIG. 14 is a flowchart illustrating verification control algorithm for two-dimensional/three-dimensional mapping technology, in accordance with a technique of this disclosure. Cloud computing system 106 may cause the UAV to fly to the starting point in the solar farm based on three-dimensional coordinates for the starting point (1400, 1402, 1404). Cloud computing system 106 may also cause the UAV to capture images at a predefined scanning speed and at predefined flight locations in the solar farm (1406). The UAV may store the images to an SD card and/or transmit the image data wirelessly to cloud computing system 106 (1408). If cloud computing system 106 determines that the captured images do not cover the desired scanning area, cloud computing system 106 may cause the UAV to repeat the flight plan to capture the missing images (1410, 1412). Otherwise, cloud computing system 106 may store to a cloud network the images and grid lines that indicate the position of each image (1414).

Figure 15:
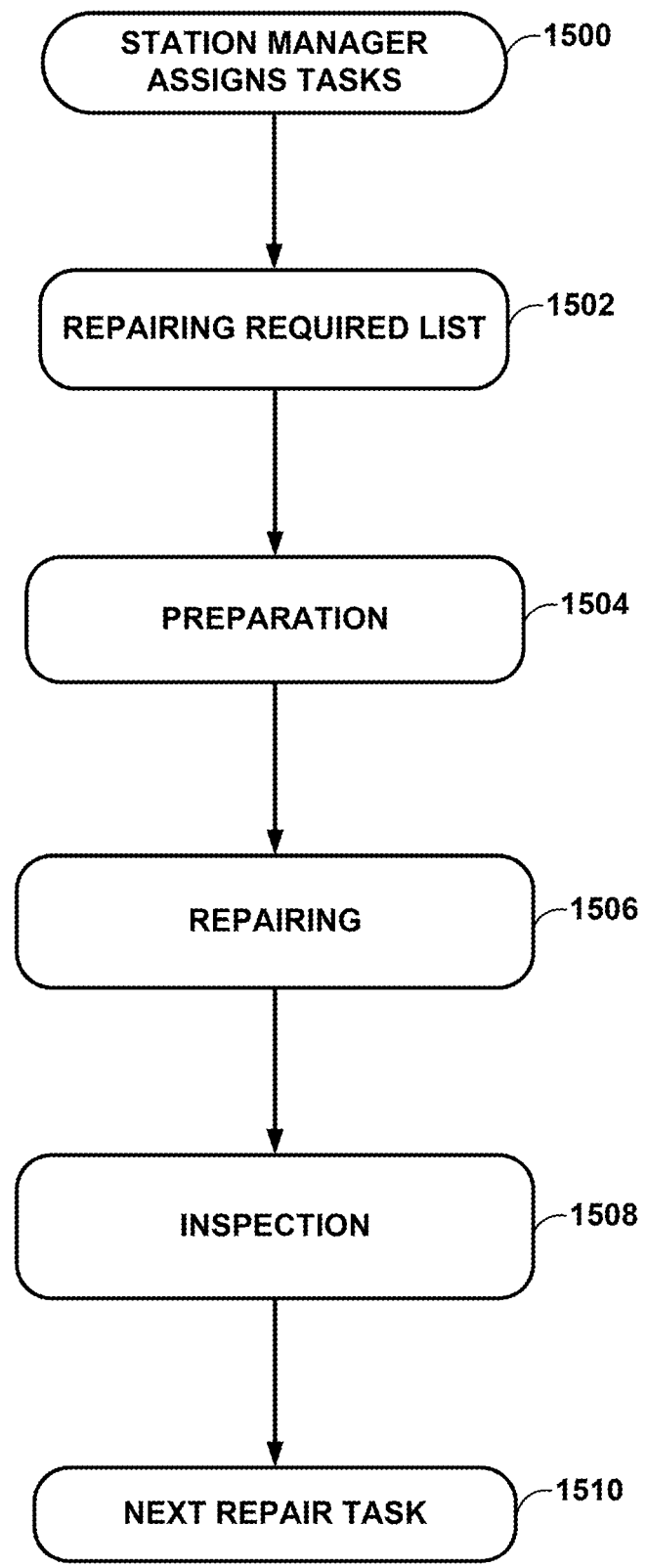
FIG. 15 is a flowchart illustrating a procedure for e-repair, in accordance with a technique of this disclosure.

FIG. 15 is a flowchart illustrating a procedure for e-repair, in accordance with a technique of this disclosure. A solar farm may include a central control processing station that monitors the total power generation of the solar farm. The smallest piece of the solar farm that this control station can monitor and manage may be limited to either one set of circuit breaker section or a small transformer section. The control station may consider environmental conditions, such as time of year, time of day, cloud cover, precipitation, and other conditions that may affect the amount of power generated. In addition, the individual solar panel status such as the percentage of affected solar panels also may be included into the analysis flow chart.

There may be four groups of solar panels: suggested for repair, suggested for maintenance, percentage of affected area, old traceability data). In some examples, cloud computing system 106 may condense the four groups into two groups: suggested repair and suggested maintenance. Cloud computing system 106 may move the groups of suggested for maintenance, percentage of affected area, and old traceability data into the maintenance-check basket again.

Cloud computing system 106 may send the repair list to the station manager who can assign the tasks to field workers (1500). The repairing workers can also use a mobile device such as a smartphone or tablet to know the location of each solar panel, identify which solar panel is required to repair and ensure that a damaged solar panel has the condition determined by cloud computing system 106 based on images from the UAV inspection. Each field worker may receive a repair list via a mobile device (1502).

Cloud computing system 106 may be configured to generate and output an alert indicating that a solar panel has a fault by causing a computing device to display the location and condition of the solar panel to the station manager. Cloud computing system 106 may also be configured to cause a mobile device to display the position and condition to a field worker so that the field worker can find the solar panel. Depending on the condition of the solar panel, the field worker may obtain a replacement solar panel and/or repair tools from a warehouse (1504). The mobile device may also present the repair procedures and a repair performing sheet or checklist to the field worker.

To perform the repair, the mobile device may present the location of the solar panel to the field worker to help the field worker identify the solar panel (1506). The field worker may verify that cloud computing system 106 accurately determined the condition of the solar panel. The mobile device may also be configured to present the inspection procedure and a sign-off sheet to the field worker (1508). The mobile device may also present a list of inspection tools to the field worker. After the repair and inspection are complete, the mobile device may direct the field worker to the next repair task (1510).

During the preparation, repair, and inspection process, cloud computing system 106 may be configured to present a graphical user interface to a user. The graphical user interface may include a map of the solar farm and a graphical icon indicating the location of a solar panel in the solar farm. The position of the graphical icon on the graphical user interface may assist the user (e.g., a field worker) in locating the solar panel within the solar farm. Cloud computing system 106 may present the graphical icon of the solar panel in response to determining that the solar panel has a fault. In this way, the graphical user interface may only show solar panels with faults to reduce clutter on the graphical user interface. In some examples, the graphical user interface may include functionality to allow the user to access details of solar panels, including solar panels without faults.

Cloud computing system 106 may be configured to present the graphical user interface via a mobile device, which may be remote from cloud computing system 106. Cloud computing system 106 and the mobile device may communicate via a cloud network such as a virtual private network. The cloud network may connect mobile devices, desktop devices, and server computers. All of the stakeholders in the solar farm, such as managers, workers, shareholders, and so on, may have access to the cloud network. Cloud technology used to automatically save the images on web server is not limited to local or global internet cloud. The cloud technology can be a private and/or public cloud which is protected by the user identification and passwords. The cloud network may generate a software application for mobile devices to present users with a map and indications of solar panel faults.

Cloud computing system 106 may be configured to receive user input from a first user such as a manager. The user input may indicate that the manager is assigning a solar panel to a second user, such as a field worker. In response to receiving the user input, cloud computing system 106 may be configured to associate the solar panel with the second user. Cloud computing system 106 may then be configured to determine that a mobile device is associated with the second user and to present the graphical user interface via the mobile device in response to determining that the mobile device is associated with the second user. The mobile device may be associated with the second user if the mobile device is the second user's company-assigned smartphone or tablet.

Cloud computing system 106 may also be configured to determine a confidence metric for the determination that the solar panel includes the fault. The confidence metric may indicate the severity of the damage to the solar panel. In some examples, the color or the size of the graphical icon may indicate the severity of the problem with the solar panel. For example, a red-colored graphical icon may indicate a more severe or urgent problem, and a green-colored graphical icon may indicate a less severe or urgent problem.

The cloud application may include the following functionality. First the cloud application may include automatic flight planning for UAVs and predefined flight locations for triggering a camera to capture images. The cloud application may automatically receive images from a UAV via wireless transfer and generate a mapping model of the solar farm with the images. The cloud application may then automatically analyze the images to detect faults for the solar panels. The cloud application may classify each fault into a basket or category (good, maintenance, or repair) and assign maintenance and repair tasks to users. The cloud application may also generate reports that include relevant data for users. Cloud computing system 106 may link to the power generation monitoring computing system for power efficient check.

Figure 16:
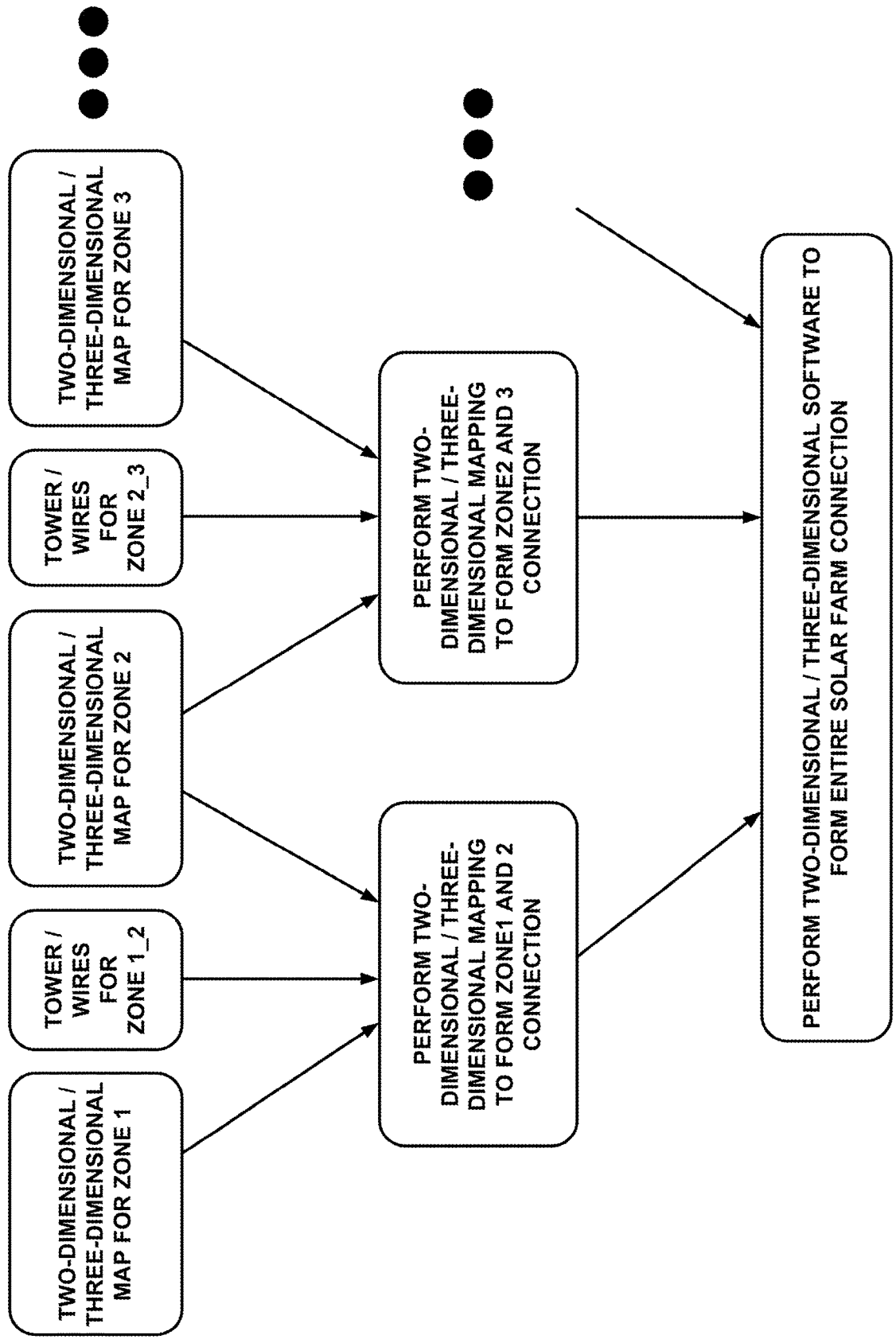
FIG. 16 is a flowchart illustrating a software algorithm to form a model of an entire solar farm, in accordance with a technique of this disclosure.

FIG. 16 is a flowchart illustrating a software algorithm to form a model of an entire solar farm, in accordance with a technique of this disclosure. The model of the solar farm may be based on one or more set of images captured on one or more UAV flights. The solar farm may include several zones, where each zone may include solar panels, towers, transformers, inverter, circuit breaker boxes, and/or wires. Between zones 1 and 2, for example, the solar farm may include towers and wires. In mapping zones 1 and 2 together to form a connection, cloud computing system 106 may include the maps for each zone and the map of the towers and wires. Cloud computing system 106 may store a map of the solar farm and use the map to generate a two-dimensional or three-dimensional model of the solar farm. The model may allow a user to zoom in on a specific solar panel or zoom out to see the entire solar farm or a group of solar panels.

Cloud computing system 106 may be configured to construct a model of a solar farm and determine that a first image depicts a particular solar panel within the solar farm based on the model. Cloud computing system 106 may associate the first image with the solar panel in response to determining that the first image depicts the solar panel. The association between the first image and the solar panel may be a software object that causes the first image to show up when a user searches for the solar panel. Cloud computing system 106 may receive a second image and determine that he second image depicts the solar panel based on the model. Cloud computing system 106 may associate the second image with the solar panel in response to determining that the second image depicts the solar panel.

Figure 17:
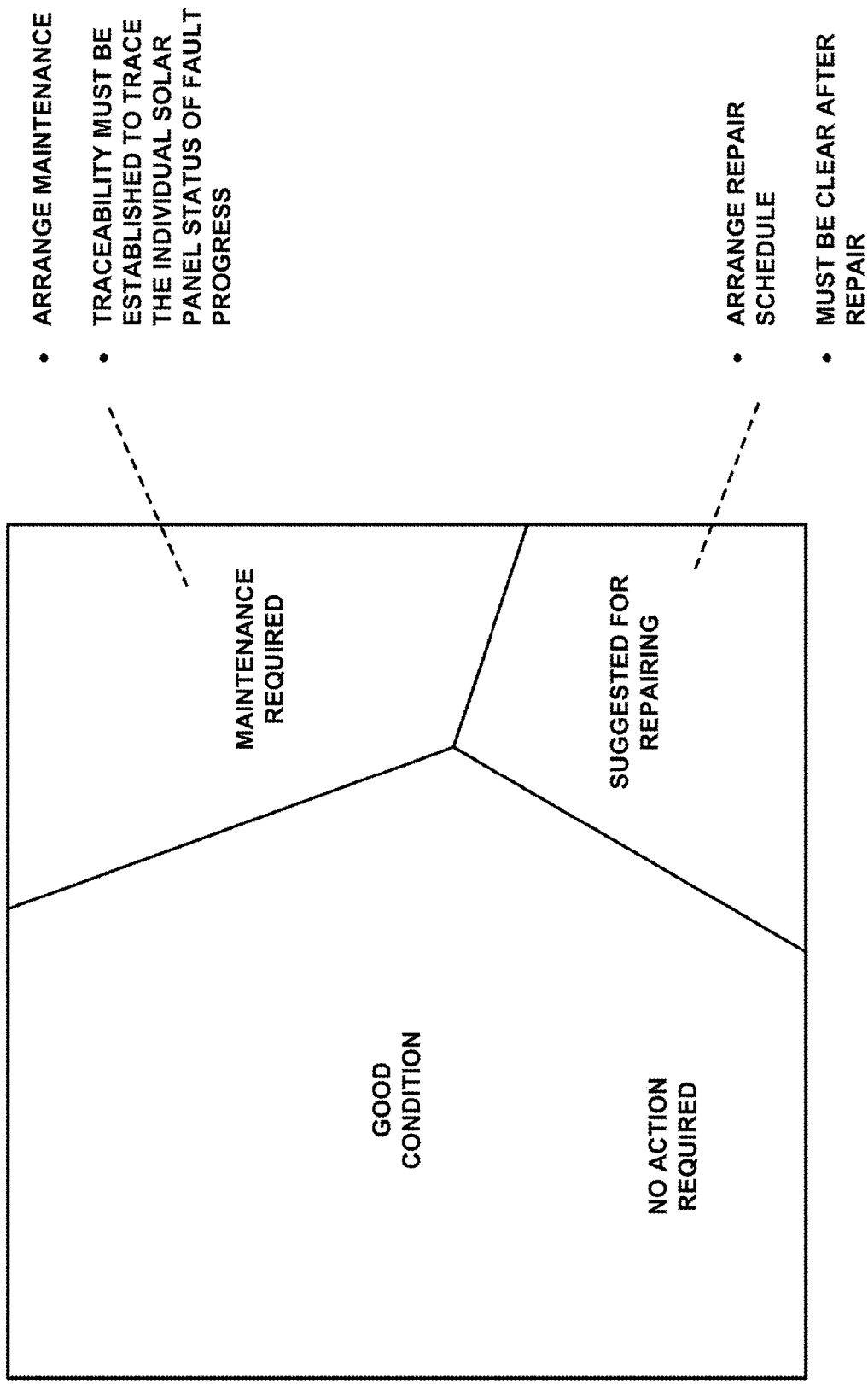
FIG. 17 illustrates fault detection and recognition processes, in accordance with a technique of this disclosure.

FIG. 17 illustrates fault detection and recognition processes, in accordance with a technique of this disclosure. FIG. 17 shows three baskets for solar panels: good condition, maintenance, and repair. For solar panels that need maintenance and repair, cloud computing system 106 may be configured to arrange the maintenance or repairs by assigning the solar panel to a field worker and alerting the worker to the location and condition of the solar panel. Cloud computing system 106 may trace the condition of the solar panel to assess the progress of the fault (e.g., whether the maintenance resolved the fault). The tracing may include assessing the scores of future images of the solar panels to determine if the condition has improved. For solar panels that have repairs, cloud computing system 106 may keep the solar panels on the repair list until cloud computing system 106 determines that new images show that fault has been cleared (e.g., the solar panel is in good condition).

Figure 18:
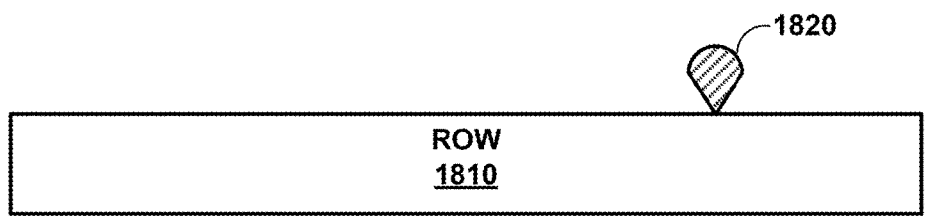
FIG. 18 illustrates a graphical user interface including graphical icons that indicate solar panels with faults, in accordance with some examples of this disclosure.
Figure 18:
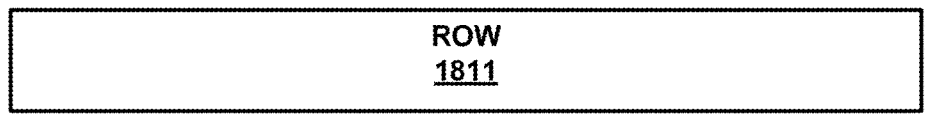
Figure 18:
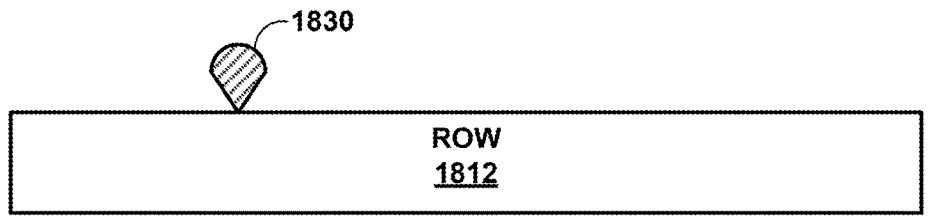
Figure 18:
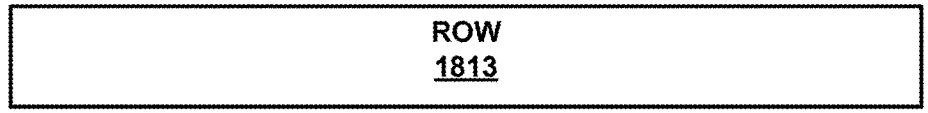

FIG. 18 illustrates a graphical user interface 1800 including graphical icons 1820 and 1830 that indicate solar panels with faults, in accordance with some examples of this disclosure. Graphical user interface 1800 includes a map of a solar farm with rows 1810-1813 of solar panels. Cloud computing system 106 may present graphical user interface 1800 to a user or may cause a mobile device to present graphical user interface 1800 to a user. Graphical icons 1820 and 1830 represent solar panels with faults.

A user may interact with graphical user interface 1800 by providing user inputs. For example, a user may select graphical icon 1820 or graphical icon 1830 to access information about the solar panel and the fault, including images of the solar panel. A user may zoom in or zoom out on the view of the solar farm, or the user may move the view laterally without changing the view. As a user zooms in, graphical user interface 1800 may present graphical icons for every solar panel, including the solar panels that do not have faults. Graphical user interface 1800 may present information for a particular solar panel, even a solar panel without a fault, based on a user input indicating that the user has selected a graphical icon associated with the particular solar panel. The view of the solar farm shown in graphical user interface 1800 may be the entire solar farm or only a small portion of the solar farm.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Example 1. A method for detecting a fault in a solar panel in a solar farm includes obtaining, by a computing system, a first image of the solar panel captured by a UAV during a first flight and a second image of the solar panel captured by the UAV during a second flight. The method also includes determining, by the computing system, a first score for the solar panel based on the first image and determining a second score for the solar panel based on the second image. The method further includes determining, by the computing system, that the solar panel includes a fault based on the first score and the second score. The method includes outputting, by the computing system, an indication that the solar panel includes the fault in response to determining that the solar panel includes the fault.

Example 2. The method of example 1, further including obtaining, by the computing system, a set of images of the solar panel including the first image and the second image captured by the UAV during a set flights including the first flight and the second flight. The method also includes determining, by the computing system, a set of scores for the solar panel based on the set of images by at least determining a respective score for the solar panel based on each respective image of the set of images. The method includes determining, by the computing system, that at least a threshold percentage of scores of the set of scores is less than a threshold score, wherein determining that the solar panel includes the fault is further based on determining that at least the threshold percentage of scores of the set of scores is less than the threshold score.

Example 3. The method of examples 1-2 or any combination thereof, wherein the first image is a first visible-light image of the solar panel, and the second image is a second visible-light image of the solar panel. The method further includes obtaining, by the computing system, a first infrared image of the solar panel captured by the UAV during the first flight. The method also includes obtaining, by the computing system, a second infrared image of the solar panel captured by the UAV during the second flight. Determining the first score for the solar panel is further based on the first infrared image, and determining the second score for the solar panel is further based on the second infrared image.

Example 4. The method of examples 1-3 or any combination thereof, wherein determining the first score for the solar panel based on the first infrared image includes determining the first score for the solar panel based on a temperature of the solar panel in the first infrared image. In addition, determining the second score for the solar panel based on the second infrared image includes determining the second score for the solar panel based on a temperature of the solar panel in the second infrared image. The color of the solar panel may be used in addition to or in the alternative to the temperature of the solar panel.

Example 5. The method of examples 1-4 or any combination thereof, wherein determining the first score for the solar panel includes determining a first light intensity emitted by the solar panel during a first electroluminescence test in the first image. In addition, determining the second score for the solar panel includes determining a second light intensity emitted by the solar panel during a second electroluminescence test in the second image.

Example 6. The method of examples 1-5 or any combination thereof, further including presenting, via a mobile device, a graphical user interface including a map of the solar farm.

Example 7. The method of examples 1-6 or any combination thereof, wherein outputting the indication that the solar panel includes the fault includes presenting, via the mobile device, a graphical icon of the solar panel on the graphical user interface in response to determining that the solar panel includes the fault.

Example 8. The method of examples 1-7 or any combination thereof, further including receiving, by the computing system, user input from a first user and associating, by the computing system, the solar panel with a second user in response to receiving the user input. The method further includes determining, by the computing system, that the mobile device is associated with the second user. The method also includes presenting, via the mobile device, the graphical user interface including the graphical icon in response to determining that the solar panel includes the fault and in response to determining that the mobile device is associated with the second user.

Example 9. The method of examples 1-8 or any combination thereof, further including determining a confidence metric for the determination that the solar panel includes the fault, wherein presenting the graphical icon includes presenting, via the mobile device, the graphical icon of the solar panel on the graphical user interface based on the confidence metric.

Example 10. The method of examples 1-9 or any combination thereof, wherein the fault is a first fault, the method further including determining, by the computing system and based on the first image, a third score for an element of a solar panel assembly that includes the solar panel, wherein the element is not a solar panel. The method further includes determining, by the computing system and based on the second image, a fourth score for the element and determining, by the computing system, that the element includes a second fault based on the third score and the fourth score. The method includes outputting, by the computing system, an indication that the element includes the second fault in response to determining that the element includes the fault.

Example 11. The method of examples 1-10 or any combination thereof, further including constructing a model of the solar farm and determining that the first image depicts the solar panel based on the model of the solar farm. The method further includes associating the first image and the solar panel in response to determining that the first image depicts the solar panel. The method also includes determining that the second image depicts the solar panel based on the model of the solar farm. The method includes associating the second image and the solar panel in response to determining that the second image depicts the solar panel.

Example 12. A computing system includes a memory configured to store a first image of the solar panel captured by a UAV during a first flight and a store a second image of the solar panel captured by the UAV during a second flight. The computing system also includes one or more processing circuits configured to determine a first score for the solar panel based on the first image and a second score for the solar panel based on the first image. The one or more processing circuits are also configured to determine whether the solar panel includes a fault based on the first score and the second score. The one or more processing circuits are further configured to output an indication that the solar panel includes the fault in response to determining that the solar panel includes the fault.

Example 13. The computing system of example 12, wherein the memory device is configured to store a set of images of the solar panel including the first image and the second image captured by the UAV during a set of flights including the first flight and the second flight. The processing circuitry is further configured to determine a set of scores for the solar panel based on the set of images by at least determining a respective score for the solar panel based on each respective image of the set of images. The processing circuitry is also configured to determine that at least a threshold percentage of scores of the set of scores is less than a threshold score. The processing circuitry is configured to determine that the solar panel includes the fault further based on determining that at least the threshold percentage of scores of the set of scores is less than the threshold score.

Example 14. The computing system of examples 12-13 or any combination thereof, wherein the first image is a first visible-light image of the solar panel, and the second image is a second visible-light image of the solar panel. The memory device is further configured to store a first infrared image of the solar panel captured by the UAV during the first flight and store a second infrared image of the solar panel captured by the UAV during the second flight. The processing circuitry is configured to determine the first score for the solar panel further based on a temperature of the solar panel in the first infrared image. In addition, the processing circuitry is configured to determine the second score for the solar panel further based on a temperature of the solar panel in the second infrared image.

Example 15. The computing system of examples 12-14 or any combination thereof, wherein the processing circuitry is configured to determine the first score for the solar panel by at least determining a first light intensity emitted by the solar panel during a first electroluminescence test in the first image. The processing circuitry is configured to determine the second score for the solar panel by at least determining a second light intensity emitted by the solar panel during a second electroluminescence test in the second image.

Example 16. The computing system of examples 12-15 or any combination thereof, wherein the processing circuitry is further configured to present, via a mobile device, a graphical user interface including a map of the solar farm. The processing circuitry is configured to output the indication that the solar panel includes the fault by at least presenting, via the mobile device, a graphical icon of the solar panel on the graphical user interface in response to determining that the solar panel includes the fault.

Example 17. The computing system of examples 12-16 or any combination thereof, wherein the processing circuitry is further configured to receive user input from a first user and associate the solar panel with a second user in response to receiving the user input. The processing circuitry is also configured to determine that the mobile device is associated with the second user and present, via the mobile device, the graphical user interface including the graphical icon in response to determining that the solar panel includes the fault and in response to determining that the mobile device is associated with the second user.

Example 18. The computing system of examples 12-17 or any combination thereof, further including determining a confidence metric for the determination that the solar panel includes the fault, wherein presenting the graphical icon includes presenting, via the mobile device, the graphical icon of the solar panel on the graphical user interface based on the confidence metric.

Example 19. The computing system of examples 12-18 or any combination thereof, wherein the processing circuitry is further configured to construct a model of the solar farm and determine that the first image depicts the solar panel based on the model of the solar farm. The processing circuitry is also configured to associate the first image in response to determining that the first image depicts the solar panel based on the model of the solar farm. The processing circuitry is further configured to determine that the second image depicts the solar panel based on the model of the solar farm and associate the second image in response to determining that the second image depicts the solar panel based on the model of the solar farm.

Example 20. A non-transitory computer-readable storage medium having instructions stored thereon that, when executed, cause a computing system to obtain a first image of the solar panel captured by a UAV during a first flight and a second image of the solar panel captured by the UAV during a second flight. The instructions, when executed, also cause a computing system to determine a first score for the solar panel based on the first image and a second score for the solar panel based on the first image. The instructions, when executed, further cause a computing system to determine whether the solar panel includes a fault based on the first score and the second score. The instructions, when executed, cause a computing system to output an indication that the solar panel includes the fault in response to determining that the solar panel includes the fault.

Various examples have been described. These and other examples are within the scope of the following claims.

What is claimed is:

1. A method for detecting a fault in a solar panel in a solar farm, the method comprising:
    obtaining, by a computing system, a first image of the solar panel captured by an unmanned aerial vehicle (UAV) during a first flight;
    obtaining, by the computing system, a second image of the solar panel captured by the UAV during a second flight;
    determining, by the computing system, a first score for the solar panel based on the first image;
    determining, by the computing system, a second score for the solar panel based on the second image;
    determining, by the computing system, that the solar panel includes the fault based on the first score and the second score;
    outputting, by the computing system, an indication that the solar panel includes the fault in response to determining that the solar panel includes the fault.

2. The method of claim 1, further comprising:
    obtaining, by the computing system, a set of images of the solar panel including the first image and the second image captured by the UAV during a set of flights including the first flight and the second flight;
    determining, by the computing system, a set of scores for the solar panel based on the set of images by at least determining a respective score for the solar panel based on each respective image of the set of images; and
    determining, by the computing system, that at least a threshold percentage of scores of the set of scores is less than a threshold score,
    wherein determining that the solar panel includes the fault is further based on determining that at least the threshold percentage of scores of the set of scores is less than the threshold score.

3. The method of claim 1,
    wherein the first image is a first visible-light image of the solar panel,
    wherein the second image is a second visible-light image of the solar panel,
    wherein the method further comprises:
        obtaining, by the computing system, a first infrared image of the solar panel captured by the UAV during the first flight; and
        obtaining, by the computing system, a second infrared image of the solar panel captured by the UAV during the second flight,
        wherein determining the first score for the solar panel is further based on the first infrared image, and
        wherein determining the second score for the solar panel is further based on the second infrared image.

4. The method of claim 3,
    wherein determining the first score for the solar panel based on the first infrared image comprises determining the first score for the solar panel based on a temperature of the solar panel in the first infrared image, and
    wherein determining the second score for the solar panel based on the second infrared image comprises determining the second score for the solar panel based on the temperature of the solar panel in the second infrared image.

5. The method of claim 1,
    wherein determining the first score for the solar panel comprises determining a first light intensity emitted by the solar panel during a first electroluminescence test in the first image, and
    wherein determining the second score for the solar panel comprises determining a second light intensity emitted by the solar panel during a second electroluminescence test in the second image.

6. The method of claim 1, further comprising presenting, via a mobile device, a graphical user interface including a map of the solar farm.

7. The method of claim 6, wherein outputting the indication that the solar panel includes the fault comprises presenting, via the mobile device, a graphical icon of the solar panel on the graphical user interface in response to determining that the solar panel includes the fault.

8. The method of claim 7, further comprising:
receiving, by the computing system, user input from a first user;
associating, by the computing system, the solar panel with a second user in response to receiving the user input;
determining, by the computing system, that the mobile device is associated with the second user; and
presenting, via the mobile device, the graphical user interface including the graphical icon in response to determining that the solar panel includes the fault and in response to determining that the mobile device is associated with the second user.

9. The method of claim 7, further comprising determining a confidence metric for the determination that the solar panel includes the fault,
wherein presenting the graphical icon comprises presenting, via the mobile device, the graphical icon of the solar panel on the graphical user interface based on the confidence metric.

10. The method of claim 1, wherein the fault is a first fault, the method further comprising:
determining, by the computing system and based on the first image, a third score for an element of a solar panel assembly that includes the solar panel, wherein the element is not the solar panel;
determining, by the computing system and based on the second image, a fourth score for the element;
determining, by the computing system, that the element includes a second fault based on the third score and the fourth score; and
outputting, by the computing system, an indication that the element includes the second fault in response to determining that the element includes the second fault.

11. The method of claim 1, further comprising:
constructing a model of the solar farm;
determining that the first image depicts the solar panel based on the model of the solar farm;
associating the first image and the solar panel in response to determining that the first image depicts the solar panel;
determining that the second image depicts the solar panel based on the model of the solar farm; and
associating the second image and the solar panel in response to determining that the second image depicts the solar panel.

12. A computing system comprising:
a memory device configured to:
store a first image of a solar panel captured by an UAV during a first flight; and
store a second image of the solar panel captured by the UAV during a second flight; and
processing circuitry configured to:
determine a first score for the solar panel based on the first image;
determine a second score for the solar panel based on the second image;
determine whether the solar panel includes a fault based on the first score and the second score; and
output an indication that the solar panel includes the fault in response to determining that the solar panel includes the fault.

13. The computing system of claim 12,
wherein the memory device is configured to store a set of images of the solar panel including the first image and the second image captured by the UAV during a set of flights including the first flight and the second flight,
wherein the processing circuitry is further configured to:
determine a set of scores for the solar panel based on the set of images by at least determining a respective score for the solar panel based on each respective image of the set of images; and
determine that at least a threshold percentage of scores of the set of scores is less than a threshold score,
wherein the processing circuitry is configured to determine that the solar panel includes the fault further based on determining that at least the threshold percentage of scores of the set of scores is less than the threshold score.

14. The computing system of claim 12,
wherein the first image is a first visible-light image of the solar panel,
wherein the second image is a second visible-light image of the solar panel,
wherein the memory device is further configured to:
store a first infrared image of the solar panel captured by the UAV during the first flight; and
store a second infrared image of the solar panel captured by the UAV during the second flight,
wherein the processing circuitry is configured to determine the first score for the solar panel further based on a temperature of the solar panel in the first infrared image, and
wherein the processing circuitry is configured to determine the second score for the solar panel further based on a temperature of the solar panel in the second infrared image.

15. The computing system of claim 12,
wherein the processing circuitry is configured to determine the first score for the solar panel by at least determining a first light intensity emitted by the solar panel during a first electroluminescence test in the first image, and
wherein the processing circuitry is configured to determine the second score for the solar panel by at least determining a second light intensity emitted by the solar panel during a second electroluminescence test in the second image.

16. The computing system of claim 12, wherein the processing circuitry is further configured to present, via a mobile device, a graphical user interface including a map of the solar farm,
wherein the processing circuitry is configured to output the indication that the solar panel includes the fault by at least presenting, via the mobile device, a graphical icon of the solar panel on the graphical user interface in response to determining that the solar panel includes the fault.

17. The computing system of claim 16, wherein the processing circuitry is further configured to:
receive user input from a first user;
associate the solar panel with a second user in response to receiving the user input;
determine that the mobile device is associated with the second user; and
present, via the mobile device, the graphical user interface including the graphical icon in response to determining that the solar panel includes the fault and in response to determining that the mobile device is associated with the second user.

18. The computing system of claim 17, further comprising determining a confidence metric for the determination that the solar panel includes the fault, wherein presenting the graphical icon comprises presenting, via the mobile device, the graphical icon of the solar panel on the graphical user interface based on the confidence metric.

19. The computing system of claim 12, wherein the processing circuitry is further configured to:
construct a model of the solar farm;
determine that the first image depicts the solar panel based on the model of the solar farm;
associate the first image in response to determining that the first image depicts the solar panel based on the model of the solar farm;
determine that the second image depicts the solar panel based on the model of the solar farm; and
associate the second image in response to determining that the second image depicts the solar panel based on the model of the solar farm.

20. A non-transitory computer-readable storage medium having instructions stored thereon that, when executed, cause a computing system to:
obtain a first image of a solar panel captured by an unmanned aerial vehicle (UAV) during a first flight;
obtain a second image of the solar panel captured by the UAV during a second flight;
determine a first score for the solar panel based on the first image;
determine a second score for the solar panel based on the second image;
determine that the solar panel includes a fault based on the first score and the second score; and
output an indication that the solar panel includes the fault in response to determining that the solar panel includes the fault.

* * * * *